(12) United States Patent
Yamada et al.

(10) Patent No.: US 7,663,587 B2
(45) Date of Patent: Feb. 16, 2010

(54) LIQUID CRYSTAL DISPLAY DEVICE

(75) Inventors: Yoshitaka Yamada, Fukaya (JP);
Ryoichi Watanabe, Fukaya (JP);
Masaki Kinoshita, Fukaya (JP);
Yoshihiro Watanabe, Gyoda (JP);
Sadayasu Fujibayashi, Fukaya (JP);
Norihiro Yoshida, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 535 days.

(21) Appl. No.: 11/468,659

(22) Filed: Aug. 30, 2006

(65) Prior Publication Data

US 2007/0075950 A1 Apr. 5, 2007

(30) Foreign Application Priority Data

Sep. 6, 2005 (JP) ............................ 2005-257954
Mar. 8, 2006 (JP) ............................ 2006-062860

(51) Int. Cl.
*G09G 3/36* (2006.01)

(52) U.S. Cl. ...................... 345/89; 345/690; 345/694; 345/698; 349/129

(58) Field of Classification Search ................. 345/55, 345/89, 690, 694, 698; 349/129
See application file for complete search history.

(56) References Cited

U.S. PATENT DOCUMENTS 7,098,975 B2   8/2006   Yamada

| | | | |
|---|---|---|---|
| 7,453,429 B2 * | 11/2008 | Chang et al. | ................... 345/89 |
| 2001/0015782 A1 * | 8/2001 | Takato et al. | ................. 349/129 |
| 2003/0146893 A1 * | 8/2003 | Sawabe | ........................ 345/89 |
| 2004/0061711 A1 * | 4/2004 | Kurumisawa et al. | ........ 345/698 |
| 2006/0066794 A1 * | 3/2006 | Hotta et al. | .................. 349/129 |

FOREIGN PATENT DOCUMENTS

| JP | 2003-295160 | 10/2003 |
|---|---|---|
| JP | 2004-62094 | 2/2004 |
| JP | 2004-318112 | 11/2004 |
| KR | 10-2005-0039981 | 5/2005 |

\* cited by examiner

*Primary Examiner*—Amare Mengistu
*Assistant Examiner*—Dmitriy Bolotin
(74) *Attorney, Agent, or Firm*—Oblon, Spivak, McClelland, Maier & Neustadt, L.L.P.

(57) ABSTRACT

A liquid crystal display device has a gradation display function of at least an n-number of gray levels and has a viewing angle characteristic of $Mi/Mj \leq 1.3$ in a case where a display luminance range in a normal direction to a display surface in a gradation range of predetermined gray levels i to j is Li to Lj and a display luminance range in an oblique viewing-angle direction of 30° or more is Mi to Mj (where n, i and j are real numbers, and $n \geq i > j \geq 0$). The liquid crystal display device has a display mode in which a display image is displayed with a display luminance range of the display image being limited to Li to Lj.

15 Claims, 21 Drawing Sheets

| Lin | Lout |
|---|---|
| 0 | 232 |
| 1 | |
| ... | ↓ |
| 27 | |
| 28 | 233 |
| ... | ↓ |
| 46 | |
| 47 | 234 |
| ... | ↓ |
| 62 | |
| 63 | 235 |

| Lin | Lout |
|---|---|
| 64 | |
| ... | ↓ |
| 76 | |
| 77 | 236 |
| ... | ↓ |
| 89 | |
| 90 | 237 |
| ... | ↓ |
| 100 | |
| 101 | 238 |
| ... | ↓ |
| 112 | |
| 113 | 239 |
| ... | ↓ |
| 123 | |
| 124 | 240 |
| 125 | |
| 126 | |
| 127 | |

| Lin | Lout |
|---|---|
| 128 | |
| ... | ↓ |
| 133 | |
| 134 | 241 |
| ... | ↓ |
| 143 | |
| 144 | 242 |
| ... | ↓ |
| 152 | |
| 153 | 243 |
| ... | ↓ |
| 162 | |
| 163 | 244 |
| ... | ↓ |
| 171 | |
| 172 | 245 |
| ... | ↓ |
| 179 | |
| 180 | 246 |
| ... | ↓ |
| 188 | |
| 189 | 247 |
| 190 | |
| 191 | |

| Lin | Lout |
|---|---|
| 192 | |
| ... | ↓ |
| 196 | |
| 197 | 248 |
| ... | ↓ |
| 205 | |
| 206 | 249 |
| ... | ↓ |
| 213 | |
| 214 | 250 |
| ... | ↓ |
| 221 | |
| 222 | 251 |
| ... | ↓ |
| 228 | |
| 229 | 252 |
| ... | ↓ |
| 236 | |
| 237 | 253 |
| ... | ↓ |
| 243 | |
| 244 | 254 |
| ... | ↓ |
| 251 | |
| 252 | 255 |
| 253 | |
| 254 | |
| 255 | ↓ |

FIG. 9

|     | Lout |     |     |
| --- | --- | --- | --- |
| Lin | R | G | B |
| 0 | 40 | 42 | 35 |
| 1 | 40 | 42 | 35 |
| 2 | 40 | 42 | 35 |
| 3 | 40 | 42 | 35 |
| 4 | 40 | 42 | 35 |
| 5 | 40 | 42 | 35 |
| 6 | 40 | 42 | 35 |
| 7 | 41 | 42 | 36 |
| 8 | 41 | 43 | 36 |
| 9 | 41 | 43 | 36 |
| 10 | 41 | 43 | 36 |
| 11 | 41 | 43 | 37 |
| 12 | 42 | 43 | 37 |
| 13 | 42 | 44 | 37 |
| 14 | 42 | 44 | 38 |
| 15 | 42 | 44 | 38 |
| 16 | 43 | 44 | 38 |
| 17 | 43 | 45 | 39 |
| 18 | 43 | 45 | 39 |
| 19 | 44 | 45 | 39 |
| 20 | 44 | 45 | 40 |
| 21 | 44 | 46 | 40 |
| 22 | 45 | 46 | 41 |
| 23 | 45 | 46 | 41 |
| 24 | 45 | 47 | 41 |
| 25 | 46 | 47 | 42 |
| 26 | 46 | 47 | 42 |
| 27 | 46 | 48 | 43 |
| 28 | 47 | 48 | 43 |
| 29 | 47 | 48 | 44 |
| 30 | 47 | 49 | 44 |
| 31 | 48 | 49 | 44 |
| 32 | 48 | 49 | 45 |
| 33 | 49 | 50 | 45 |
| 34 | 49 | 50 | 46 |
| 35 | 49 | 50 | 46 |
| 36 | 50 | 51 | 47 |
| 37 | 50 | 51 | 47 |
| 38 | 51 | 52 | 48 |
| 39 | 51 | 52 | 48 |
| 40 | 51 | 52 | 49 |
| 41 | 52 | 53 | 50 |
| 42 | 52 | 53 | 50 |
| 43 | 53 | 54 | 51 |
| 44 | 53 | 54 | 51 |
| 45 | 54 | 55 | 52 |
| 46 | 54 | 55 | 52 |
| 47 | 55 | 55 | 53 |
| 48 | 55 | 56 | 54 |
| 49 | 56 | 56 | 54 |
| 50 | 56 | 57 | 55 |
| 51 | 57 | 57 | 55 |
| 52 | 57 | 58 | 56 |
| 53 | 58 | 58 | 57 |
| 54 | 58 | 59 | 57 |
| 55 | 59 | 59 | 58 |
| 56 | 59 | 60 | 58 |
| 57 | 60 | 60 | 59 |
| 58 | 60 | 61 | 60 |
| 59 | 61 | 61 | 60 |
| 60 | 61 | 61 | 61 |
| 61 | 62 | 62 | 62 |
| 62 | 62 | 62 | 62 |
| 63 | 63 | 63 | 63 |

FIG. 10

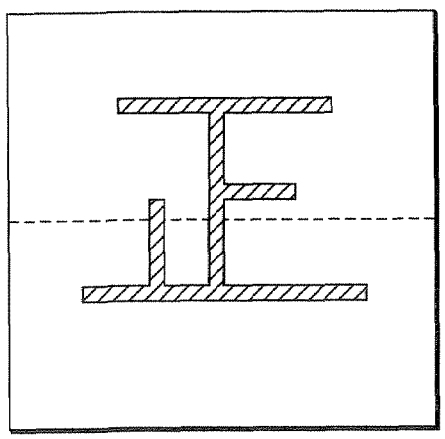 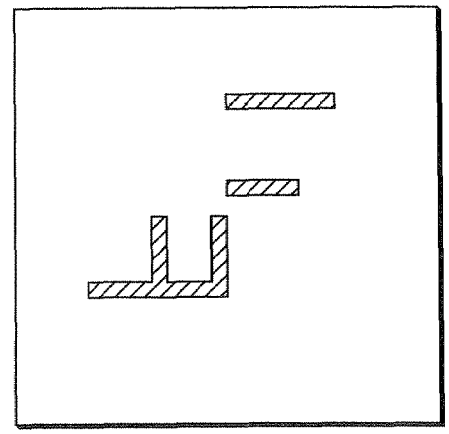
F I G. 14A  F I G. 14B
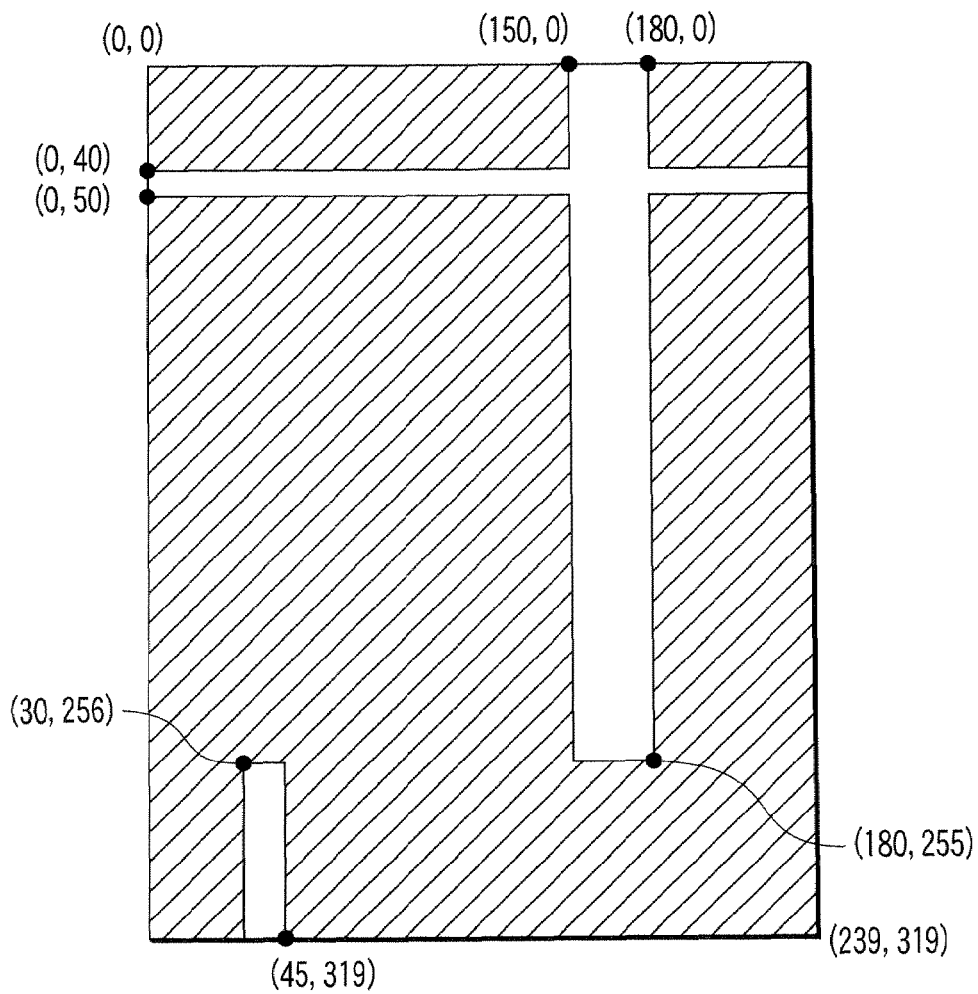
F I G. 15

Table 1

| Lin | Lout | Lin | Lout | Lin | Lout | Lin | Lout |
|---|---|---|---|---|---|---|---|
| 0 | 40 | 64 | 43 | 128 | 48 | 192 | 55 |
| 1 | 40 | 65 | 43 | 129 | 48 | 193 | 55 |
| 2 | 40 | 66 | 43 | 130 | 48 | 194 | 55 |
| 3 | 40 | 67 | 43 | 131 | 48 | 195 | 55 |
| 4 | 40 | 68 | 43 | 132 | 48 | 196 | 55 |
| 5 | 40 | 69 | 43 | 133 | 48 | 197 | 56 |
| 6 | 40 | 70 | 43 | 134 | 49 | 198 | 56 |
| 7 | 40 | 71 | 43 | 135 | 49 | 199 | 56 |
| 8 | 40 | 72 | 43 | 136 | 49 | 200 | 56 |
| 9 | 40 | 73 | 43 | 137 | 49 | 201 | 56 |
| 10 | 40 | 74 | 43 | 138 | 49 | 202 | 56 |
| 11 | 40 | 75 | 43 | 139 | 49 | 203 | 56 |
| 12 | 40 | 76 | 43 | 140 | 49 | 204 | 56 |
| 13 | 40 | 77 | 44 | 141 | 49 | 205 | 56 |
| 14 | 40 | 78 | 44 | 142 | 49 | 206 | 57 |
| 15 | 40 | 79 | 44 | 143 | 49 | 207 | 57 |
| 16 | 40 | 80 | 44 | 144 | 50 | 208 | 57 |
| 17 | 40 | 81 | 44 | 145 | 50 | 209 | 57 |
| 18 | 40 | 82 | 44 | 146 | 50 | 210 | 57 |
| 19 | 40 | 83 | 44 | 147 | 50 | 211 | 57 |
| 20 | 40 | 84 | 44 | 148 | 50 | 212 | 57 |
| 21 | 40 | 85 | 44 | 149 | 50 | 213 | 57 |
| 22 | 40 | 86 | 44 | 150 | 50 | 214 | 58 |
| 23 | 40 | 87 | 44 | 151 | 50 | 215 | 58 |
| 24 | 40 | 88 | 44 | 152 | 50 | 216 | 58 |
| 25 | 40 | 89 | 44 | 153 | 51 | 217 | 58 |
| 26 | 40 | 90 | 45 | 154 | 51 | 218 | 58 |
| 27 | 40 | 91 | 45 | 155 | 51 | 219 | 58 |
| 28 | 41 | 92 | 45 | 156 | 51 | 220 | 58 |
| 29 | 41 | 93 | 45 | 157 | 51 | 221 | 58 |
| 30 | 41 | 94 | 45 | 158 | 51 | 222 | 59 |
| 31 | 41 | 95 | 45 | 159 | 51 | 223 | 59 |
| 32 | 41 | 96 | 45 | 160 | 51 | 224 | 59 |
| 33 | 41 | 97 | 45 | 161 | 51 | 225 | 59 |
| 34 | 41 | 98 | 45 | 162 | 51 | 226 | 59 |
| 35 | 41 | 99 | 45 | 163 | 52 | 227 | 59 |
| 36 | 41 | 100 | 45 | 164 | 52 | 228 | 59 |
| 37 | 41 | 101 | 46 | 165 | 52 | 229 | 60 |
| 38 | 41 | 102 | 46 | 166 | 52 | 230 | 60 |
| 39 | 41 | 103 | 46 | 167 | 52 | 231 | 60 |
| 40 | 41 | 104 | 46 | 168 | 52 | 232 | 60 |
| 41 | 41 | 105 | 46 | 169 | 52 | 233 | 60 |
| 42 | 41 | 106 | 46 | 170 | 52 | 234 | 60 |
| 43 | 41 | 107 | 46 | 171 | 52 | 235 | 60 |
| 44 | 41 | 108 | 46 | 172 | 53 | 236 | 60 |
| 45 | 41 | 109 | 46 | 173 | 53 | 237 | 61 |
| 46 | 41 | 110 | 46 | 174 | 53 | 238 | 61 |
| 47 | 42 | 111 | 46 | 175 | 53 | 239 | 61 |
| 48 | 42 | 112 | 46 | 176 | 53 | 240 | 61 |
| 49 | 42 | 113 | 47 | 177 | 53 | 241 | 61 |
| 50 | 42 | 114 | 47 | 178 | 53 | 242 | 61 |
| 51 | 42 | 115 | 47 | 179 | 53 | 243 | 61 |
| 52 | 42 | 116 | 47 | 180 | 54 | 244 | 62 |
| 53 | 42 | 117 | 47 | 181 | 54 | 245 | 62 |
| 54 | 42 | 118 | 47 | 182 | 54 | 246 | 62 |
| 55 | 42 | 119 | 47 | 183 | 54 | 247 | 62 |
| 56 | 42 | 120 | 47 | 184 | 54 | 248 | 62 |
| 57 | 42 | 121 | 47 | 185 | 54 | 249 | 62 |
| 58 | 42 | 122 | 47 | 186 | 54 | 250 | 62 |
| 59 | 42 | 123 | 47 | 187 | 54 | 251 | 62 |
| 60 | 42 | 124 | 48 | 188 | 54 | 252 | 63 |
| 61 | 42 | 125 | 48 | 189 | 55 | 253 | 63 |
| 62 | 42 | 126 | 48 | 190 | 55 | 254 | 63 |
| 63 | 43 | 127 | 48 | 191 | 55 | 255 | 63 |

FIG. 18A

Table 2

| Lin | Lout | Lin | Lout | Lin | Lout | Lin | Lout |
|---|---|---|---|---|---|---|---|
| 0 | 42 | 64 | 44 | 128 | 49 | 192 | 56 |
| 1 | 42 | 65 | 44 | 129 | 49 | 193 | 56 |
| 2 | 42 | 66 | 44 | 130 | 49 | 194 | 56 |
| 3 | 42 | 67 | 44 | 131 | 49 | 195 | 56 |
| 4 | 42 | 68 | 45 | 132 | 50 | 196 | 56 |
| 5 | 42 | 69 | 45 | 133 | 50 | 197 | 56 |
| 6 | 42 | 70 | 45 | 134 | 50 | 198 | 56 |
| 7 | 42 | 71 | 45 | 135 | 50 | 199 | 56 |
| 8 | 42 | 72 | 45 | 136 | 50 | 200 | 56 |
| 9 | 42 | 73 | 45 | 137 | 50 | 201 | 57 |
| 10 | 42 | 74 | 45 | 138 | 50 | 202 | 57 |
| 11 | 42 | 75 | 45 | 139 | 50 | 203 | 57 |
| 12 | 42 | 76 | 45 | 140 | 50 | 204 | 57 |
| 13 | 42 | 77 | 45 | 141 | 50 | 205 | 57 |
| 14 | 42 | 78 | 45 | 142 | 50 | 206 | 57 |
| 15 | 42 | 79 | 45 | 143 | 51 | 207 | 57 |
| 16 | 42 | 80 | 45 | 144 | 51 | 208 | 57 |
| 17 | 42 | 81 | 45 | 145 | 51 | 209 | 57 |
| 18 | 42 | 82 | 45 | 146 | 51 | 210 | 58 |
| 19 | 42 | 83 | 46 | 147 | 51 | 211 | 58 |
| 20 | 42 | 84 | 46 | 148 | 51 | 212 | 58 |
| 21 | 42 | 85 | 46 | 149 | 51 | 213 | 58 |
| 22 | 42 | 86 | 46 | 150 | 51 | 214 | 58 |
| 23 | 42 | 87 | 46 | 151 | 51 | 215 | 58 |
| 24 | 42 | 88 | 46 | 152 | 51 | 216 | 58 |
| 25 | 42 | 89 | 46 | 153 | 52 | 217 | 58 |
| 26 | 42 | 90 | 46 | 154 | 52 | 218 | 59 |
| 27 | 42 | 91 | 46 | 155 | 52 | 219 | 59 |
| 28 | 42 | 92 | 46 | 156 | 52 | 220 | 59 |
| 29 | 42 | 93 | 46 | 157 | 52 | 221 | 59 |
| 30 | 42 | 94 | 46 | 158 | 52 | 222 | 59 |
| 31 | 42 | 95 | 46 | 159 | 52 | 223 | 59 |
| 32 | 43 | 96 | 47 | 160 | 52 | 224 | 59 |
| 33 | 43 | 97 | 47 | 161 | 52 | 225 | 59 |
| 34 | 43 | 98 | 47 | 162 | 52 | 226 | 59 |
| 35 | 43 | 99 | 47 | 163 | 53 | 227 | 60 |
| 36 | 43 | 100 | 47 | 164 | 53 | 228 | 60 |
| 37 | 43 | 101 | 47 | 165 | 53 | 229 | 60 |
| 38 | 43 | 102 | 47 | 166 | 53 | 230 | 60 |
| 39 | 43 | 103 | 47 | 167 | 53 | 231 | 60 |
| 40 | 43 | 104 | 47 | 168 | 53 | 232 | 60 |
| 41 | 43 | 105 | 47 | 169 | 53 | 233 | 60 |
| 42 | 43 | 106 | 47 | 170 | 53 | 234 | 60 |
| 43 | 43 | 107 | 47 | 171 | 53 | 235 | 61 |
| 44 | 43 | 108 | 47 | 172 | 53 | 236 | 61 |
| 45 | 43 | 109 | 48 | 173 | 54 | 237 | 61 |
| 46 | 43 | 110 | 48 | 174 | 54 | 238 | 61 |
| 47 | 43 | 111 | 48 | 175 | 54 | 239 | 61 |
| 48 | 43 | 112 | 48 | 176 | 54 | 240 | 61 |
| 49 | 43 | 113 | 48 | 177 | 54 | 241 | 61 |
| 50 | 43 | 114 | 48 | 178 | 54 | 242 | 61 |
| 51 | 43 | 115 | 48 | 179 | 54 | 243 | 62 |
| 52 | 44 | 116 | 48 | 180 | 54 | 244 | 62 |
| 53 | 44 | 117 | 48 | 181 | 54 | 245 | 62 |
| 54 | 44 | 118 | 48 | 182 | 54 | 246 | 62 |
| 55 | 44 | 119 | 48 | 183 | 55 | 247 | 62 |
| 56 | 44 | 120 | 48 | 184 | 55 | 248 | 62 |
| 57 | 44 | 121 | 49 | 185 | 55 | 249 | 62 |
| 58 | 44 | 122 | 49 | 186 | 55 | 250 | 62 |
| 59 | 44 | 123 | 49 | 187 | 55 | 251 | 62 |
| 60 | 44 | 124 | 49 | 188 | 55 | 252 | 63 |
| 61 | 44 | 125 | 49 | 189 | 55 | 253 | 63 |
| 62 | 44 | 126 | 49 | 190 | 55 | 254 | 63 |
| 63 | 44 | 127 | 49 | 191 | 55 | 255 | 63 |

FIG. 18B

Table 3

| Lin | Lout | Lin | Lout | Lin | Lout | Lin | Lout |
|---|---|---|---|---|---|---|---|
| 0 | 35 | 64 | 38 | 128 | 45 | 192 | 53 |
| 1 | 35 | 65 | 38 | 129 | 45 | 193 | 53 |
| 2 | 35 | 66 | 38 | 130 | 45 | 194 | 53 |
| 3 | 35 | 67 | 38 | 131 | 45 | 195 | 54 |
| 4 | 35 | 68 | 39 | 132 | 45 | 196 | 54 |
| 5 | 35 | 69 | 39 | 133 | 45 | 197 | 54 |
| 6 | 35 | 70 | 39 | 134 | 45 | 198 | 54 |
| 7 | 35 | 71 | 39 | 135 | 46 | 199 | 54 |
| 8 | 35 | 72 | 39 | 136 | 46 | 200 | 54 |
| 9 | 35 | 73 | 39 | 137 | 46 | 201 | 54 |
| 10 | 35 | 74 | 39 | 138 | 46 | 202 | 55 |
| 11 | 35 | 75 | 39 | 139 | 46 | 203 | 55 |
| 12 | 35 | 76 | 39 | 140 | 46 | 204 | 55 |
| 13 | 35 | 77 | 39 | 141 | 46 | 205 | 55 |
| 14 | 35 | 78 | 39 | 142 | 46 | 206 | 55 |
| 15 | 35 | 79 | 40 | 143 | 47 | 207 | 55 |
| 16 | 35 | 80 | 40 | 144 | 47 | 208 | 56 |
| 17 | 35 | 81 | 40 | 145 | 47 | 209 | 56 |
| 18 | 35 | 82 | 40 | 146 | 47 | 210 | 56 |
| 19 | 35 | 83 | 40 | 147 | 47 | 211 | 56 |
| 20 | 35 | 84 | 40 | 148 | 47 | 212 | 56 |
| 21 | 35 | 85 | 40 | 149 | 47 | 213 | 56 |
| 22 | 35 | 86 | 40 | 150 | 47 | 214 | 56 |
| 23 | 35 | 87 | 40 | 151 | 48 | 215 | 57 |
| 24 | 35 | 88 | 40 | 152 | 48 | 216 | 57 |
| 25 | 36 | 89 | 40 | 153 | 48 | 217 | 57 |
| 26 | 36 | 90 | 41 | 154 | 48 | 218 | 57 |
| 27 | 36 | 91 | 41 | 155 | 48 | 219 | 57 |
| 28 | 36 | 92 | 41 | 156 | 48 | 220 | 57 |
| 29 | 36 | 93 | 41 | 157 | 48 | 221 | 58 |
| 30 | 36 | 94 | 41 | 158 | 48 | 222 | 58 |
| 31 | 36 | 95 | 41 | 159 | 49 | 223 | 58 |
| 32 | 36 | 96 | 41 | 160 | 49 | 224 | 58 |
| 33 | 36 | 97 | 41 | 161 | 49 | 225 | 58 |
| 34 | 36 | 98 | 41 | 162 | 49 | 226 | 58 |
| 35 | 36 | 99 | 42 | 163 | 49 | 227 | 58 |
| 36 | 36 | 100 | 42 | 164 | 49 | 228 | 59 |
| 37 | 36 | 101 | 42 | 165 | 49 | 229 | 59 |
| 38 | 36 | 102 | 42 | 166 | 50 | 230 | 59 |
| 39 | 36 | 103 | 42 | 167 | 50 | 231 | 59 |
| 40 | 36 | 104 | 42 | 168 | 50 | 232 | 59 |
| 41 | 36 | 105 | 42 | 169 | 50 | 233 | 59 |
| 42 | 37 | 106 | 42 | 170 | 50 | 234 | 60 |
| 43 | 37 | 107 | 42 | 171 | 50 | 235 | 60 |
| 44 | 37 | 108 | 42 | 172 | 50 | 236 | 60 |
| 45 | 37 | 109 | 43 | 173 | 50 | 237 | 60 |
| 46 | 37 | 110 | 43 | 174 | 51 | 238 | 60 |
| 47 | 37 | 111 | 43 | 175 | 51 | 239 | 60 |
| 48 | 37 | 112 | 43 | 176 | 51 | 240 | 61 |
| 49 | 37 | 113 | 43 | 177 | 51 | 241 | 61 |
| 50 | 37 | 114 | 43 | 178 | 51 | 242 | 61 |
| 51 | 37 | 115 | 43 | 179 | 51 | 243 | 61 |
| 52 | 37 | 116 | 43 | 180 | 51 | 244 | 61 |
| 53 | 37 | 117 | 43 | 181 | 52 | 245 | 61 |
| 54 | 37 | 118 | 44 | 182 | 52 | 246 | 62 |
| 55 | 37 | 119 | 44 | 183 | 52 | 247 | 62 |
| 56 | 38 | 120 | 44 | 184 | 52 | 248 | 62 |
| 57 | 38 | 121 | 44 | 185 | 52 | 249 | 62 |
| 58 | 38 | 122 | 44 | 186 | 52 | 250 | 62 |
| 59 | 38 | 123 | 44 | 187 | 52 | 251 | 62 |
| 60 | 38 | 124 | 44 | 188 | 53 | 252 | 63 |
| 61 | 38 | 125 | 44 | 189 | 53 | 253 | 63 |
| 62 | 38 | 126 | 44 | 190 | 53 | 254 | 63 |
| 63 | 38 | 127 | 45 | 191 | 53 | 255 | 63 |

$$S_{out} = \begin{cases} V_o & S_o < S_{in} \\ \dfrac{S_{in}^{\beta} + V_f}{1 + V_f} & 1 > S_o^{\beta} \end{cases} \quad \text{(Formula 1)}$$

Where
$$V_f = -\dfrac{S_o^{\beta} - V_o}{1 - V_o}$$

$S_{in}$ : Normalized input gradation
$\beta$ : Gradient coefficient
$V_o$ : Offset
$S_o$ : Normalized input reference gradation

|  | R | G | B |
|---|---|---|---|
| $\beta$ | 1.5 | 1.5 | 1.5 |
| $V_o$ | 0.63 + $\Delta V_o$ | 0.66 + $\Delta V_o$ | 0.55 + $\Delta V_o$ |
| $S_o$ | 0 | 0 | 0 |

FIG. 20

LIQUID CRYSTAL DISPLAY DEVICE

CROSS-REFERENCE TO RELATED APPLICATIONS

This application is based upon and claims the benefit of priority from prior Japanese Patent Applications No. 2005-257954, filed Sep. 6, 2005; and No. 2006-062860, filed Mar. 8, 2006, the entire contents of both of which are incorporated herein by reference.

BACKGROUND OF THE INVENTION

1. Field of the Invention

The present invention relates generally to a liquid crystal display device, and more particularly to a liquid crystal display device which is configured to be capable of realizing both a wide viewing angle and a narrow viewing angle.

2. Description of the Related Art

In recent years, mobile phones, which can display mail and images, have widely been used. In using such mobile phones, there have been increasing needs for preventing a displayed image from being peeped at by persons around the user.

To satisfy such needs, Jpn. Pat. Appln. KOKAI Publication No. 2004-062094 (Patent Document 1), for instance, proposes a structure wherein a liquid crystal plate for varying a viewing angle is superposed on the front surface of a liquid crystal display (LCD). According to the structure of Patent Document 1, however, it is difficult to restrict omnidirectional viewing angles, because of the effect of viewing angle characteristics of the liquid crystal plate for varying the viewing angle. Moreover, the addition of the liquid crystal plate for varying the viewing angle leads to demerits such as an increase in cost, thickness, weight and power consumption.

Jpn. Pat. Appln. KOKAI Publication No. 2003-295160 (Patent Document 2) and Jpn. Pat. Appln. KOKAI Publication No. 2004-318112 (Patent Document 3) propose structures wherein a lookup table is provided for adjusting a distortion of a gradation curve on a display screen due to viewing angles, and display data is generated on the basis of a result of the reference to the lookup table. According to Patent Document 2 and Patent Document 3, a screen image is displayed with a wide viewing angle range (a wide viewing angle) by making such adjustment as to decrease a distortion of the gradation curve due to viewing angles, and a screen image is displayed with a narrow viewing angle range (a narrow viewing angle) by making such adjustment as to increase a distortion of the gradation curve due to viewing angles.

BRIEF SUMMARY OF THE INVENTION

The present invention has been made in consideration of the above-described problems, and the object of the invention is to provide a liquid crystal display device which is capable of controlling viewing angles without increasing the cost of the display device or increasing the thickness, weight and power consumption of the entire display device.

According to an aspect of the invention, there is provided a liquid crystal display device having a gradation display function of at least an n-number of gray levels and having a viewing angle characteristic of $Mi/Mj \leq 1.3$ in a case where a display luminance range in a normal direction to a display surface in a gradation range of a gray level i to a gray level j is Li to Lj and a display luminance range in an oblique viewing-angle direction of 30° or more is Mi to Mj (where n, i and j are real numbers, and $n \geq i > j \geq 0$), wherein the liquid crystal display device has a display mode in which a display image is displayed with a display luminance range of the display image being limited to Li to Lj.

The present invention can provide a liquid crystal display device which is capable of controlling viewing angles without increasing the cost of the display device or increasing the thickness, weight and power consumption of the entire display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a view for explaining an example of gradation conversion of image data in Embodiment 1;

FIG. 10 is a view for explaining an example of gradation conversion of image data in Embodiment 2;

FIG. 14A is a view for explaining an example of conversion in Example 2 of Embodiment 3, and shows an example of an image which is visually recognizable when a liquid crystal display panel is observed in a frontal direction;

FIG. 14B is a view for explaining an example of conversion in Example 2 of Embodiment 3, and shows an example of an image which is visually recognizable when the liquid crystal display panel is observed in an oblique direction;

FIG. 15 is a view for explaining an example of conversion in Example 3 of Embodiment 3;

FIG. 18A shows an example of table 1 shown in FIG. 17;

FIG. 18B shows an example of table 2 shown in FIG. 17;

FIG. 18C shows an example of table 3 shown in FIG. 17;

FIG. 19 shows a relational formula which is applicable to the generation of a table in a table generating unit shown in FIG. 17;

FIG. 20 shows an example of parameters which are set in the relational formula shown in FIG. 19;

DETAILED DESCRIPTION OF THE INVENTION

A liquid crystal display device according to an embodiment of the present invention, in particular, an active-matrix liquid crystal display device, will now be described with reference to the accompanying drawings. The liquid crystal display device to be described here may be of any type, for example, a transmissive liquid crystal display device which displays an image by making use of backlight, a reflective liquid crystal display device which displays an image by making use of ambient light, or a transflective liquid crystal display device having a reflective part and a transmissive part.

Figure 1:
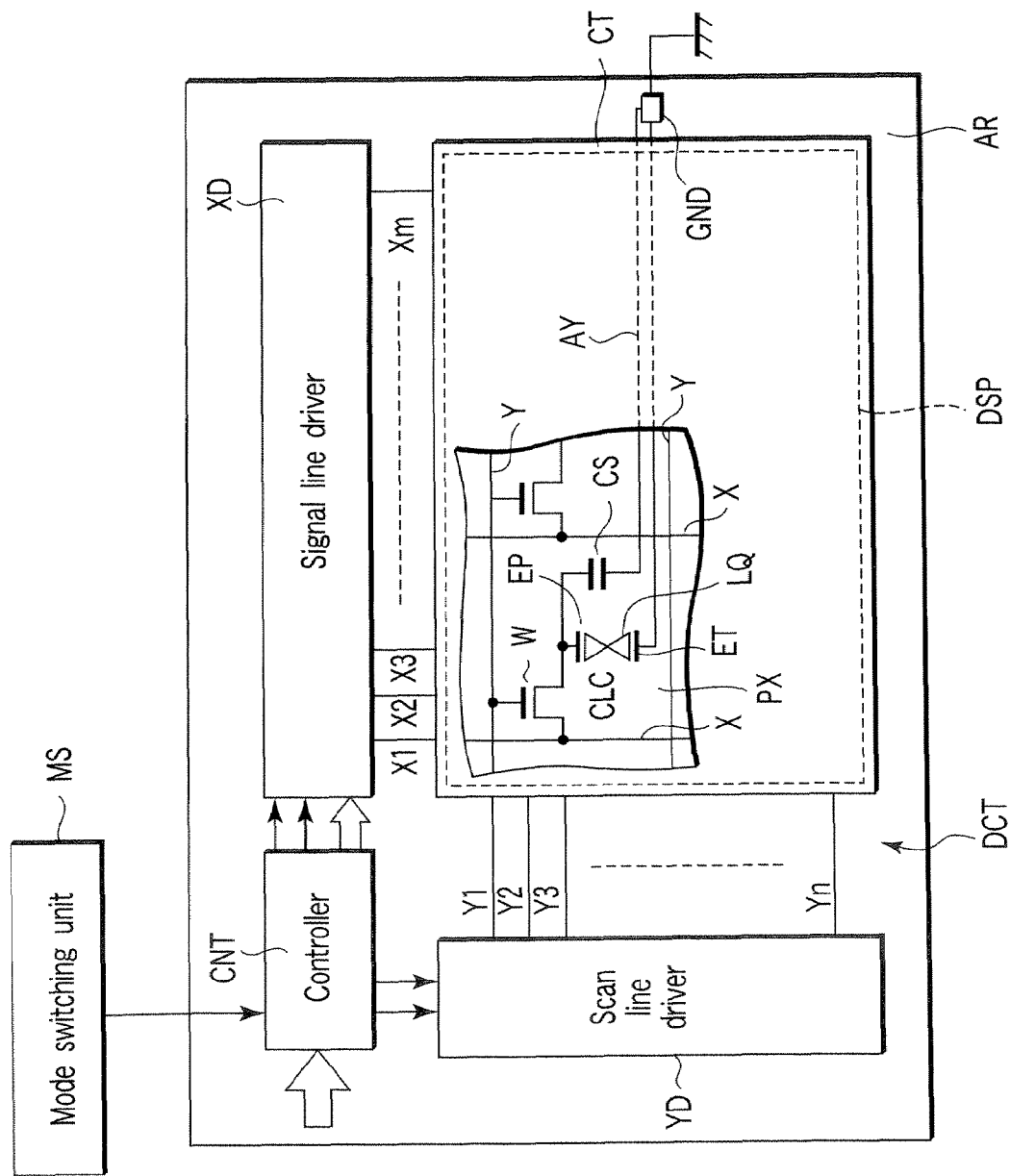
FIG. 1 schematically shows the structure of a liquid crystal display device according to an embodiment of the present invention.
Figure 2:
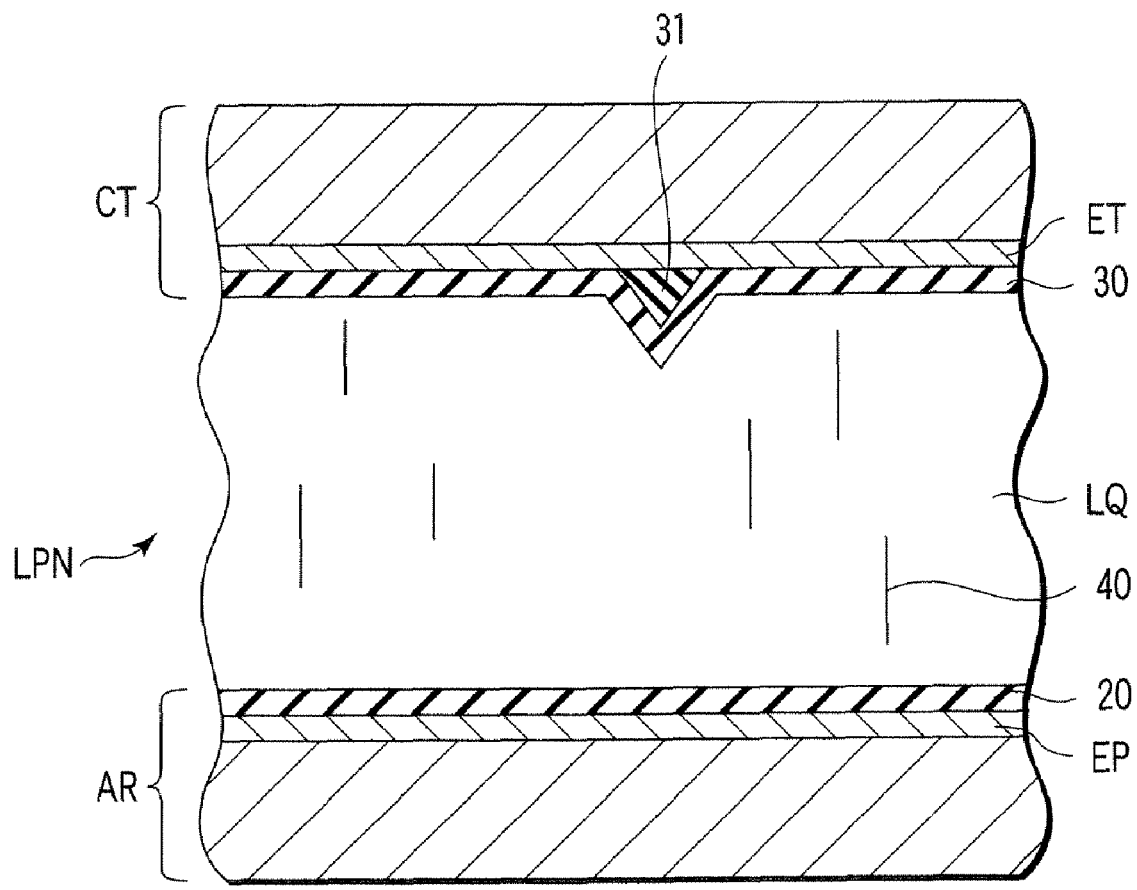
FIG. 2 schematically shows a cross-sectional structure of the liquid crystal display device shown in FIG. 1.

As is shown in FIG. 1 and FIG. 2, the liquid crystal display device includes a liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and counter-substrate CT. The liquid crystal display device includes a plurality (m×n) of pixels PX which are arranged in a matrix in a display region DSP for displaying an image.

The array substrate AR is formed by using a light-transmissive insulating substrate. The array substrate AR includes, in the display region DSP, an (m×n) number of pixel electrodes EP which are disposed in association with the pixels, an n-number of scan lines Y (Y1 to Yn) which are formed in a row direction of the pixel electrodes EP, an m-number of signal lines X (X1 to Xm) which are formed in a column direction of the pixel electrodes EP, an (m×n) number of active switching elements W (e.g. N-channel type thin-film transistors) which are disposed near intersections between the scan lines Y and signal lines X in the respective pixels PX, and storage capacitance lines AY which are capacitive-coupled to the associated pixel electrodes EP so as to constitute storage capacitances CS in parallel to liquid crystal capacitances CLC.

The array substrate AR further includes, in a driving circuit region DCT in the vicinity of the display region DSP, at least a part of a scan line driver YD which is connected to the n-number of scan lines Y, and at least a part of a signal line driver XD which is connected to the m-number of signal lines X. The scan line driver YD successively supplies scan signals (driving signals) to the n-number of scan lines Y on the basis of the control by a controller CNT. The signal line driver XD supplies video signals (driving signals) to the m-number of signal lines X on the basis of the control by the controller CNT at a timing at which the switching elements W in each row are turned on by the scan signal. Thereby, the pixel electrodes EP in each row are set at pixel potentials corresponding to the video signals which are supplied via the associated switching elements W.

The pixel electrode EP is formed of a metal film with light reflectivity, such as aluminum, in a reflective part of each of a reflective liquid crystal display device and a transflective liquid crystal display device. The pixel electrode EP, on the other hand, is formed of a metal film with light transmissivity, such as indium tin oxide (ITO), in a transmissive part of each of a transmissive liquid crystal display device and a transflective liquid crystal display device. The pixel electrodes EP associated with all the pixels PX are covered with an alignment film 20.

On the other hand, the counter-substrate CT is formed by using a light-transmissive insulating substrate. The counter-substrate CT includes a counter-electrode ET in the display region DSP. The counter-electrode ET is disposed to be opposed to the pixel electrodes EP of all pixels PX. The counter-electrode ET is formed of a metal film with light transmissivity such as indium tin oxide (ITO). The counter-electrode ET is covered with an alignment film 30.

When the counter-substrate CT and array substrate AR are disposed such that their alignment films 20 and 30 face each other, a predetermined gap is provided by spacers (not shown) which are disposed between the alignment films 20 and 30. The liquid crystal layer LQ is composed of a liquid crystal composition including liquid crystal molecules 40 which are sealed in the gap between the alignment film 20 of the array substrate AR and the alignment film 30 of the counter-substrate CT. In this embodiment, the liquid crystal layer LQ is composed of a liquid crystal composition having a negative dielectric-constant anisotropy.

The alignment films 20 and 30 are formed of thin films of a light-transmissive resin material such as polyimide. In this embodiment, the alignment films 20 and 30 are not subjected to rubbing treatment, and vertical alignment properties are imparted to the liquid crystal molecules included in the liquid crystal layer LQ.

In addition, in this embodiment, the liquid crystal display panel LPN has a multi-domain structure for dividing the direction of alignment into at least two directions in each pixel. Specifically, in this liquid crystal display panel LPN, as described above, the vertical alignment mode is adopted, in which liquid crystal molecules in each pixel are aligned substantially vertical to the substrate surface in a state in which no voltage is applied to the pixel or a voltage less than a threshold is applied to the pixel. With the provision of the multi-domain structure, in the state in which a voltage not less than the threshold is applied to the pixel, the liquid crystal molecules of the pixel are aligned oblique or substantially parallel to the substrate surface, and the direction of inclination is substantially determined by the direction of lines of electric force. In other words, with the multi-domain structure, the lines of electric force at peripheral parts of the multi-domain structure include components which do not extend vertical to the substrate surface but extend in different directions within the same pixel in dependence on, e.g. the shape of the multi-domain structure. Thus, the liquid crystal molecules are aligned in two or more directions within the same pixel.

This control of alignment can be realized by providing a protrusion, which functions as a multi-domain structure, within the pixel PX, as shown in FIG. 2. Alternatively, the control of alignment can be realized by providing a slit, which functions as a multi-domain structure, in a part of at least one of the pixel electrode EP and counter-electrode ET which are disposed in each pixel PX. Needless to say, the protrusion and the slit may be combined.

Figure 3A:
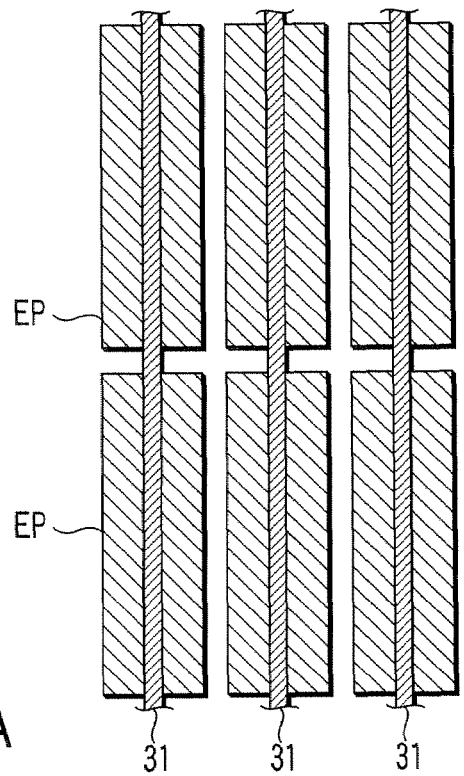
FIG. 3A schematically shows a rib structure, which is applied as a multi-domain structure in the liquid crystal display device shown in FIG. 1.
Figure 3B:
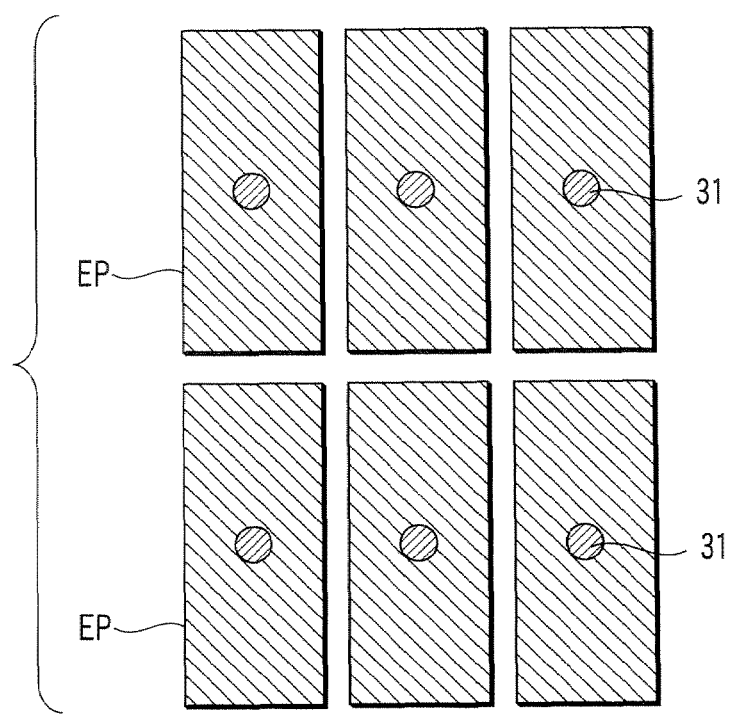
FIG. 3B schematically shows columnar or conical protrusions which are applied as a multi-domain structure in the liquid crystal display device shown in FIG. 1.

The protrusions 31 are provided, for example, on the counter-substrate CT side. The protrusions 31 may be rib structures extending in one direction of the pixels PX, as shown in FIG. 3A, or may have columnar or conical shapes and may be disposed at substantially central parts of the pixels PX, as shown in FIG. 3B.

Figure 8:
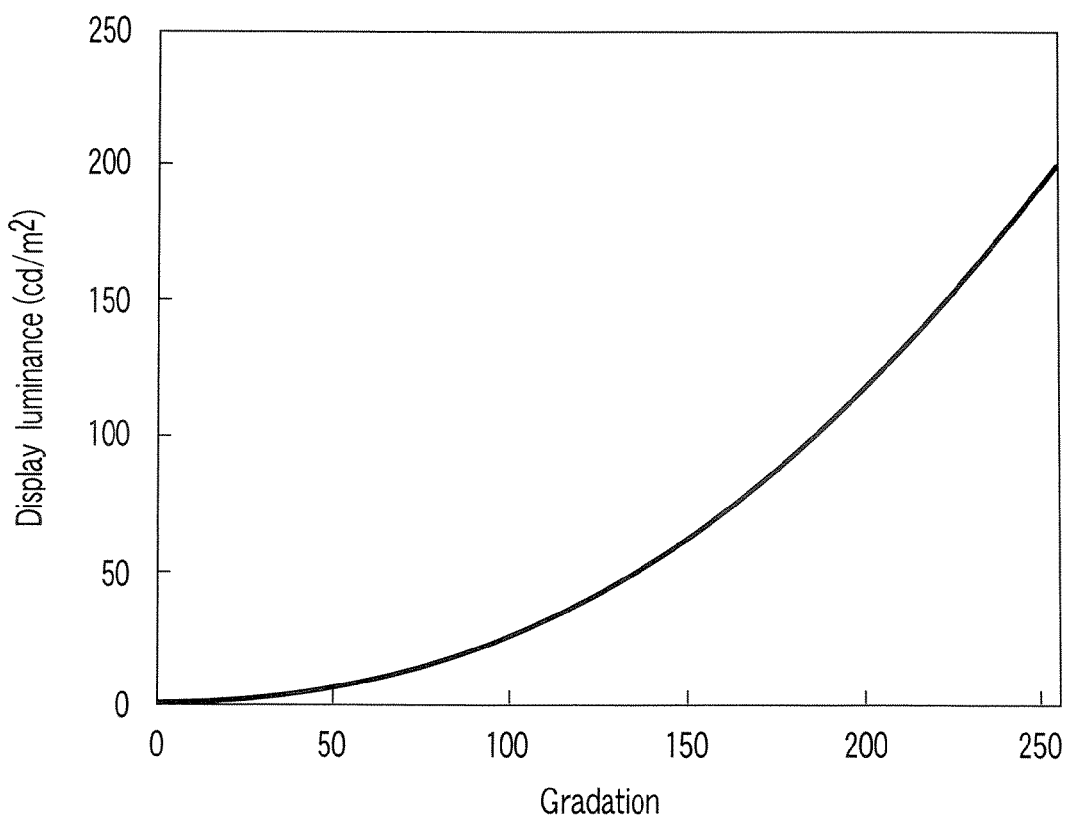
FIG. 8 is a graph showing an example of the relationship between gradation display and display luminance.

In the liquid crystal display device having the above-described structure, gradation display of at least an n-number of gray levels, e.g. 256 gray levels, can be executed by stepwise varying the voltage that is to be applied to the pixel. A relationship, as shown in FIG. 8, is present between the 256 gray levels and the display luminance (the display luminance in the frontal direction in FIG. 8). The display luminance of a display image, relative to viewing angles, was measured when the display image was displayed at respective gray levels. The display luminance of the display surface at a time when a white image is displayed is set at 100(%). The display luminance, which was measured at respective gray levels including intermediate gray levels between a black image gray level (gray level 0) and a white image gray level (gray level 255), was normalized.

Figure 4A:
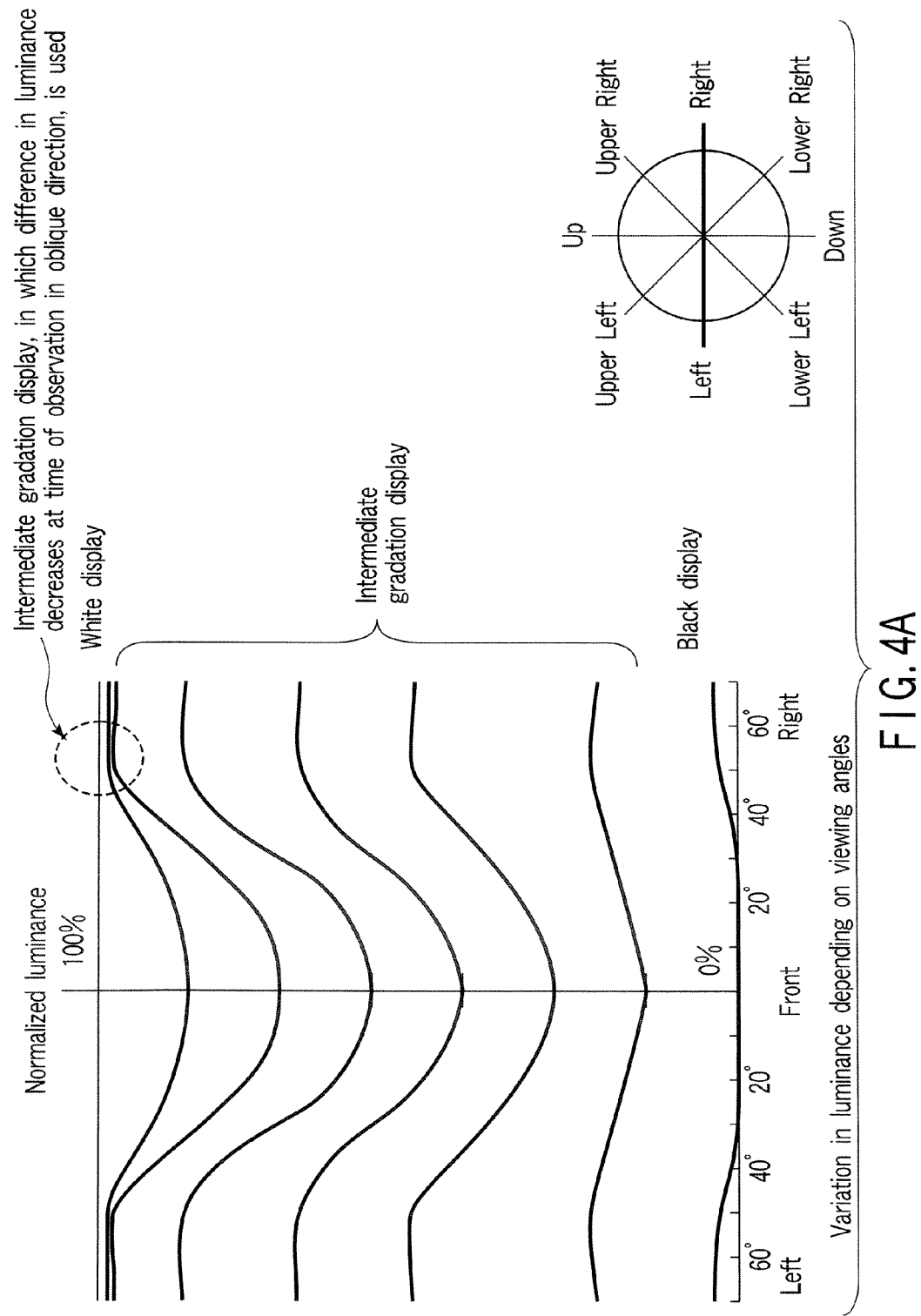
FIG. 4A shows measurement results of relative display luminance at respective gray levels in a right-and-left direction on a display surface of the liquid crystal display device shown in FIG. 1.

FIG. 4A shows measurement results of the display luminance at respective gray levels in a right-and-left direction on the display surface. It was confirmed that the display luminance increases as the viewing angle gradually increases from the normal-directional angle, and that the difference between the display luminance of the white image and the display luminance of an intermediate gradation image is very small at oblique viewing angles greater than a predetermined angle.

Figure 4B:
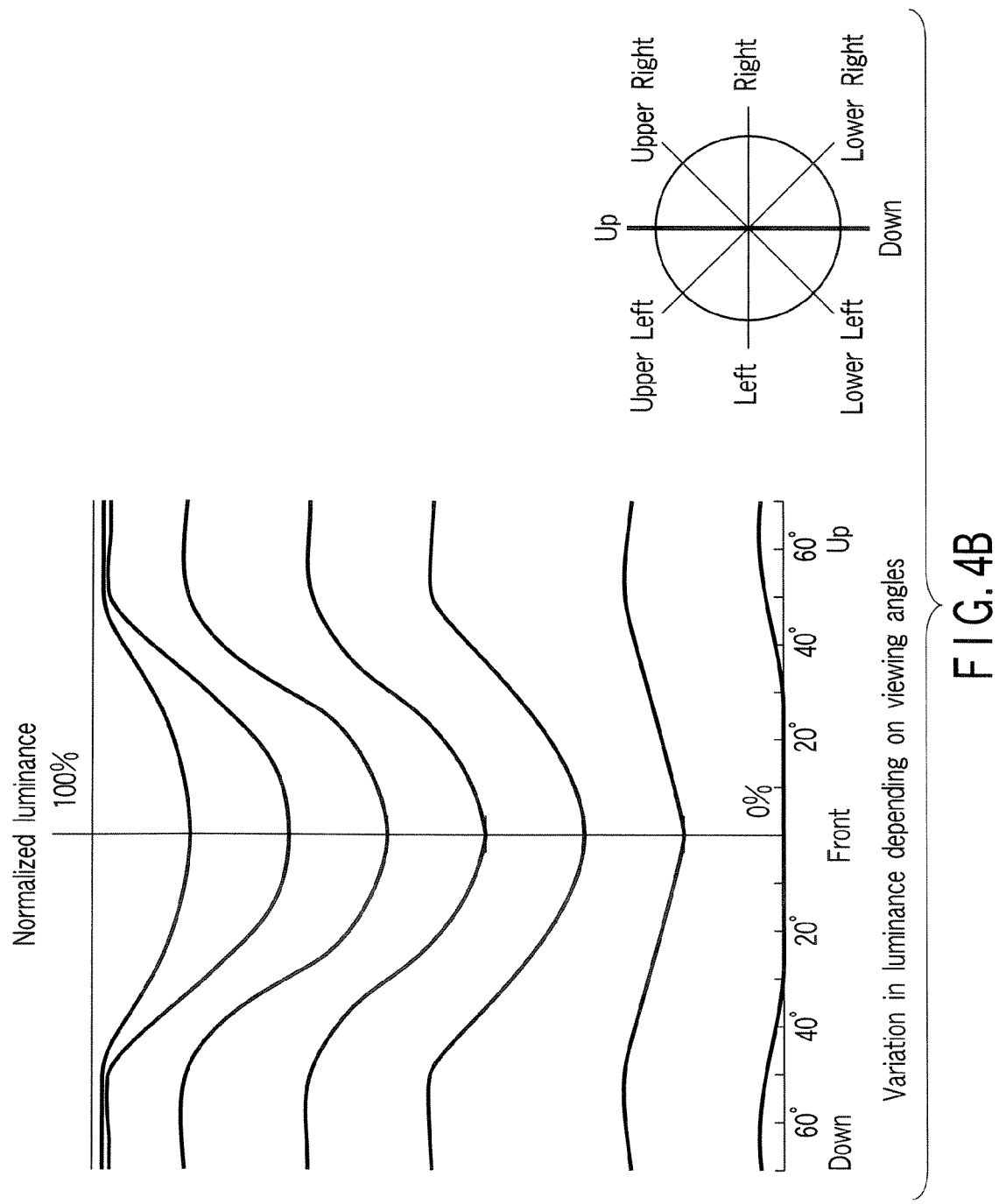
FIG. 4B shows measurement results of relative display luminance at respective gray levels in an up-and-down direction on the display surface of the liquid crystal display device shown in FIG. 1.
Figure 4C:
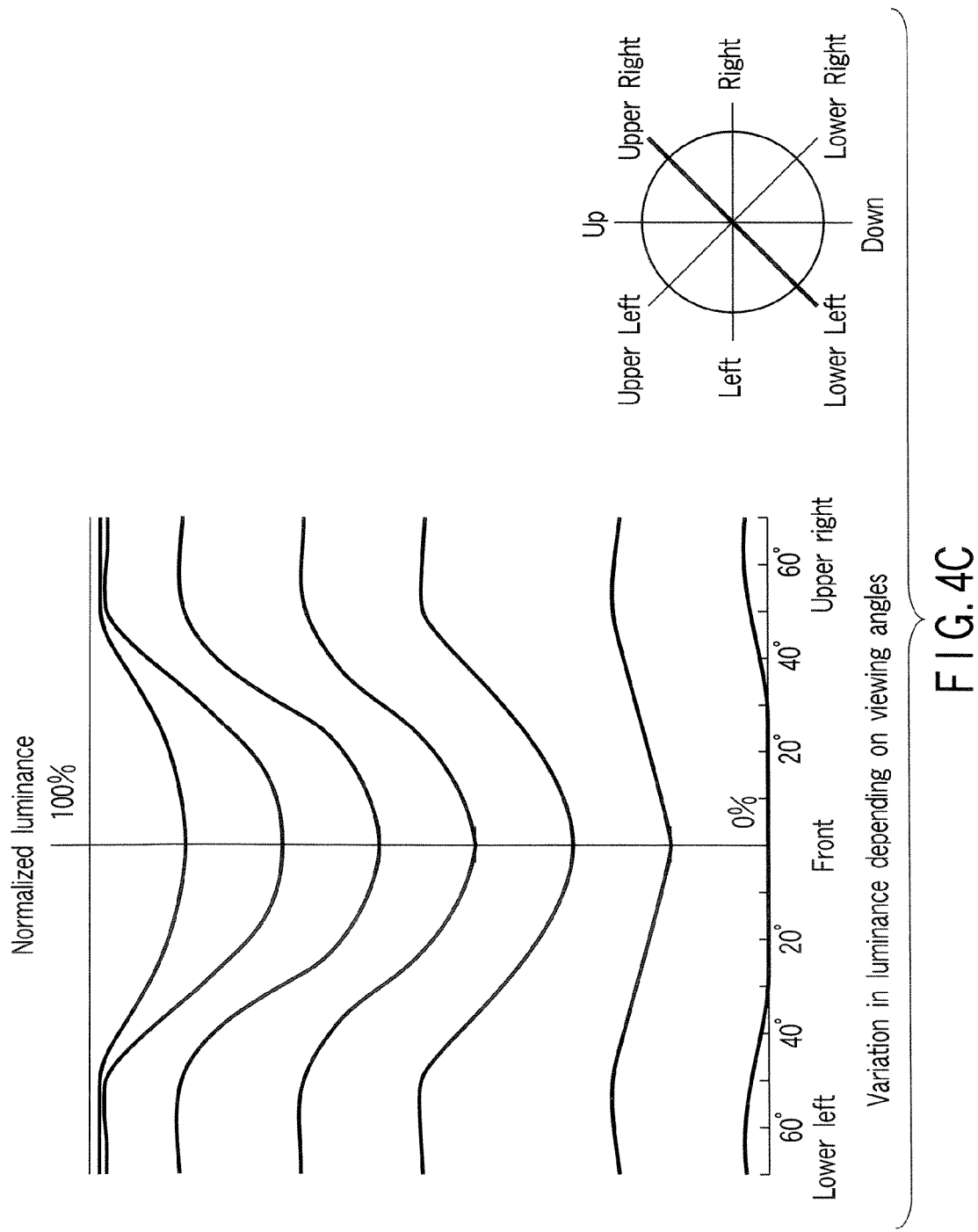
FIG. 4C shows measurement results of relative display luminance at respective gray levels in an upper-right-and-lower-left direction on the display surface of the liquid crystal display device shown in FIG. 1.
Figure 4D:
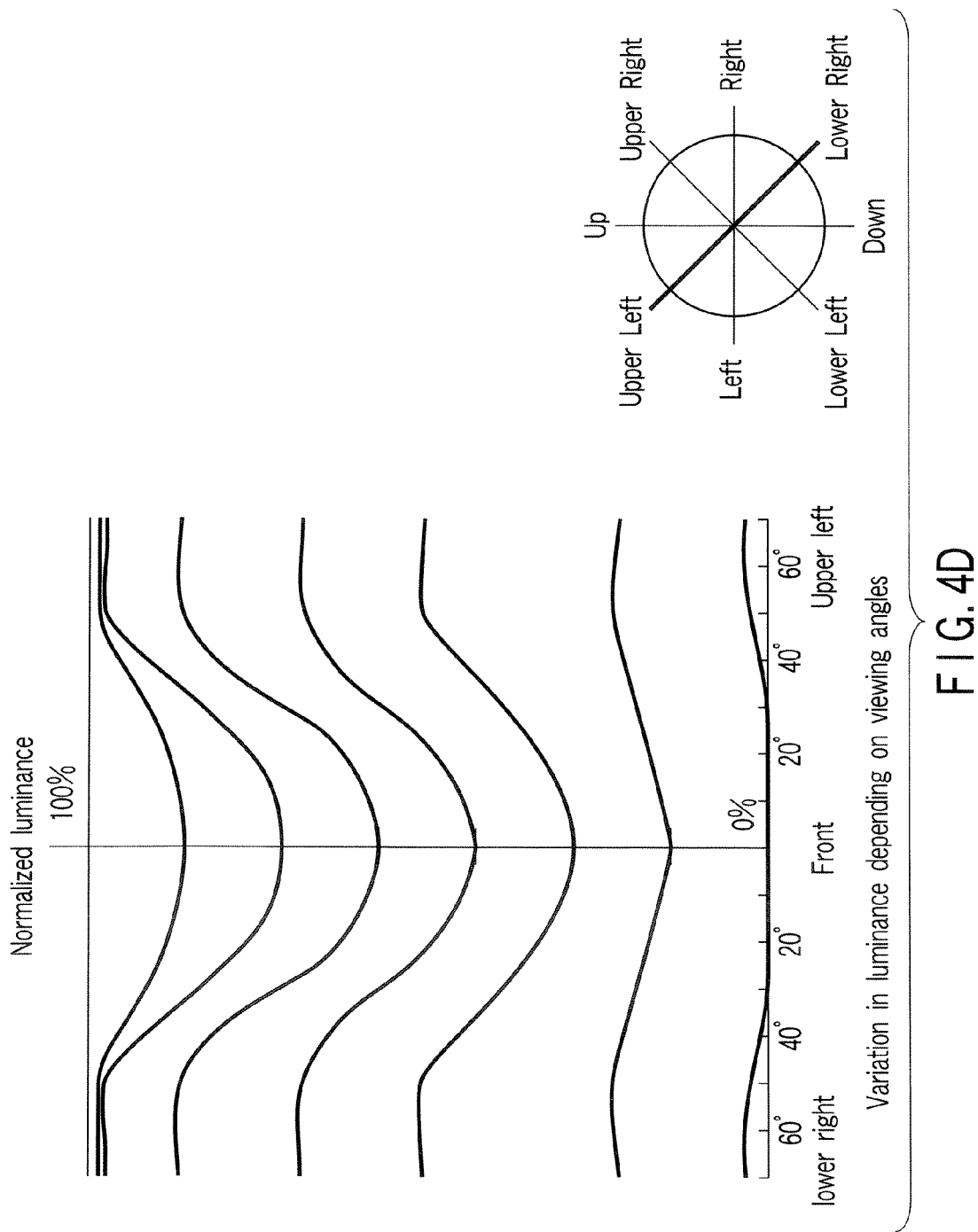
FIG. 4D shows measurement results of relative display luminance at respective gray levels in an upper-left-and-lower-right direction on the display surface of the liquid crystal display device shown in FIG. 1.

FIG. 4B shows measurement results of the display luminance at respective gray levels in an up-and-down direction, FIG. 4C shows measurement results of the display luminance at respective gray levels in an upper-right-and-lower-left direction on the display surface, and FIG. 4D shows measurement results of the display luminance at respective gray levels in an upper-left-and-lower-right direction on the display surface. These measurement results are substantially equal to the measurement results of the display luminance at respective gray levels in the right-and-left direction of the display surface, as shown in FIG. 4A. It was confirmed that the display luminance has isotropic viewing-angle characteristics.

Based on these measurement results, the inventor of the present invention paid attention to such characteristics that there is little difference in luminance between specific gray levels in any azimuth direction at oblique viewing angles greater than a predetermined angle. Specifically, attention was paid to the fact that in the liquid crystal display device according to the present embodiment, in a display luminance range of Li to Lj in a normal direction to the display surface, which corresponds to a gradation range of predetermined gray levels i (light side) to j (dark side) of an n-number of gray levels, if a ratio of display luminance Li to display luminance Lj is 150% or more, or Li/Lj≧1.5, such viewing angle characteristics that a ratio of display luminance Mi to display luminance Mj is 130% or less (preferably 110% or less), or Mi/Mj≦1.3, are exhibited in a display luminance range of Mi to Mj in an oblique viewing-angle direction of 30° or more (n, i and j are real numbers, and n≧i>j≧0). The liquid crystal display device according to the present embodiment, which is presupposed to have such viewing angle characteristics, has a display mode in which the display luminance range of the display image is limited to the range of Li to Lj.

In this display mode, an image can be displayed by selecting, e.g. gray levels in a gradation range of i to j of the n gray levels. By displaying an image in this selected gradation range, the display luminance range becomes Li to Lj in the normal direction to the display surface, while the ratio in display luminance becomes 130% or less in the oblique viewing-angle direction of 30° or more to the normal direction and the luminance greatly decreases. To be more specific, a display image is easily recognizable in a direction of a viewing angle of less than 30° from the normal direction to the display surface, while the display image is not easily recognizable in a direction of a viewing angle of 30° or more. In other words, this display mode corresponds to a narrow viewing angle mode in which the viewing-angle range, which permits recognition of a display image, is limited to less than 30° from the normal direction to the display surface. As is clear from the measurement results shown in FIG. 4A to FIG. 4D, in this narrow viewing angle mode, the characteristics of the display luminance relative to the viewing angles at respective gray levels are substantially isotropic. Therefore, in almost all azimuth directions, the viewing-angle range, which permits recognition of a display image, can be limited to less than a substantially equal angle (e.g. 30°).

On the other hand, an image can also be displayed at all displayable gray levels (gradation range of 0 to n−1). In this case, the display luminance range of the display image is $L_0$ to $L_{n-1}$. In a case where an image is displayed in this gradation range, the ratio in display luminance between gray levels in the normal direction to the display surface decreases as the tilt angle form the normal direction increases (i.e. the viewing angle increases), but a sufficient luminance is maintained even in a viewing-angle direction of 30° or more to the normal direction. Thus, the display image can be recognized in a wide viewing angle of more than 30° from the normal direction. In other words, this display mode corresponds to a wide viewing angle mode in which the viewing-angle range, which permits recognition of a display image, is increased to more than 30° from the normal direction to the display surface. As is clear from the measurement results shown in FIG. 4A to FIG. 4D, in this wide viewing angle mode, the characteristics of the display luminance relative to the viewing angles at respective gray levels are substantially isotropic. Therefore, in almost all azimuth directions, the viewing-angle range, which permits recognition of a display image, can be increased to a substantially equal angle.

In short, the liquid crystal display device according to the present embodiment has not only the wide viewing angle mode in which an image is displayed in a normally displayable luminance range (or in the entire displayable gradation range), but also the narrow viewing angle mode in which an image is displayed in a luminance range narrower than the normally displayable luminance range (or in a part of the displayable gradation range). By making use of the special viewing angle characteristics that are applied to the liquid crystal display device of the present embodiment, the following function can be realized. That is, the wide viewing angle characteristics are maintained at the time of normal display, and the display mode can be switched such that a sufficient visibility is obtained in the frontal direction while a visibility in any oblique direction is reduced and the viewing angle is limited.

To be more specific, as shown in FIG. 1, the liquid crystal display device according to the present embodiment includes a mode switching unit MS which functions as a switching means for effecting switching between the narrow viewing angle mode and the wide viewing angle mode. The mode switching unit MS has a function of switching the display mode on the basis of setting by the user. The mode switching unit MS may be a mechanical switch, or may be configured as a software switch which effects switching on the basis of input through a setting screen.

The controller CNT has a function of controlling the signal line driver XD and scan line driver YD so as to display an image on the basis of image data, which is supplied from outside, in a display mode which is selected by the mode switching unit MS (i.e. has a function of controlling voltages that are to be applied to pixels). For example, when the narrow viewing angle mode is selected, a control is executed to display an image in the gradation range of i to j. When the wide viewing angle mode is selected, a control is executed to display an image in the gradation range of 0 to n−1.

Figure 5:
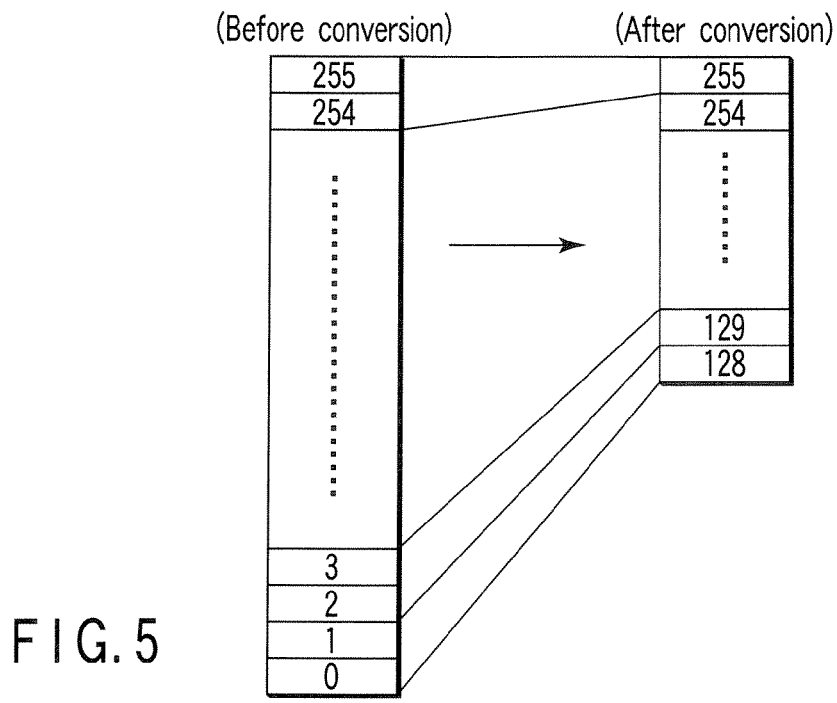
FIG. 5 is a view for explaining an example of conversion of image data in the liquid crystal display device shown in FIG. 1.

The controller CNT also has a function of data conversion means for converting image data of a display image, which is displayed in a gradation range of 0 to n−1, to image data in a gradation range of i to j, upon the switching to the narrow viewing angle mode by the mode switching unit MS. For example, as shown in FIG. 5, the controller CNT converts image data, which is displayed in the gradation range of 256 gray levels from level 0 to level 255, to image data of 128 gray levels from level 128 to level 255 (i.e. ½ of the gradation range of the original image data). At this time, the controller CNT assigns original image data of gray level 0 and gray level 1 to gray level 128, and assigns original image data of gray level 2 and gray level 3 to gray level 129. Similar assignment processes are repeated, and finally original image data of gray levels 254 and 255 is assigned to gray level 255. Thus, the gradation range of the original image data can be reduced to ½. Alternatively, the controller CNT may convert original image data to some other gradation range of 128 gray levels. In like manner, the gradation range of original image data may be reduced to ¼, ⅛, . . . . As described above, a gradation range, in which a difference in display luminance in oblique viewing-angle directions is small, is selected from the n-gray-level gradation range, and thereby the narrow viewing angle mode can be realized.

In the above-described example, in order to realize the narrow viewing angle mode, the controller CNT converts multi-gray-level image data of three or more gray levels to image data of a predetermined gradation range. In an example to be described below, a main image of a single gray level is displayed on a background image of a single gray level.

Specifically, upon switching to the narrow viewing angle mode by the mode switching unit MS, the controller CNT converts the gradation of at least one of a background image, which is displayed with a single gray level, and a main image, which is displayed with a single gray level, so that a difference in gradation between the background image and the main image may become smaller than in the wide viewing angle mode. The main image is a character image, for instance.

Figure 6:
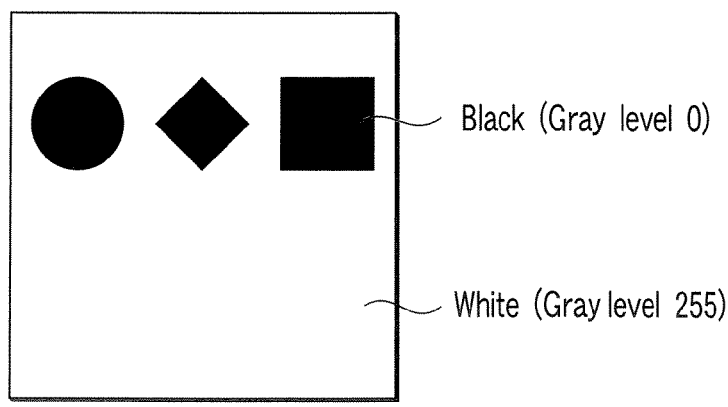
FIG. 6 is a view for explaining another example of conversion of image data in the liquid crystal display device shown in FIG. 1, and is a view for explaining display content based on original image data.

Assume now that original image data, which is supplied to the controller CNT, is binary gray-level image data, as shown in FIG. 6, in which the background image is a white image (gray level 255) and the main image is a black image (gray level 0) in the wide viewing angle mode.

Figure 7A:
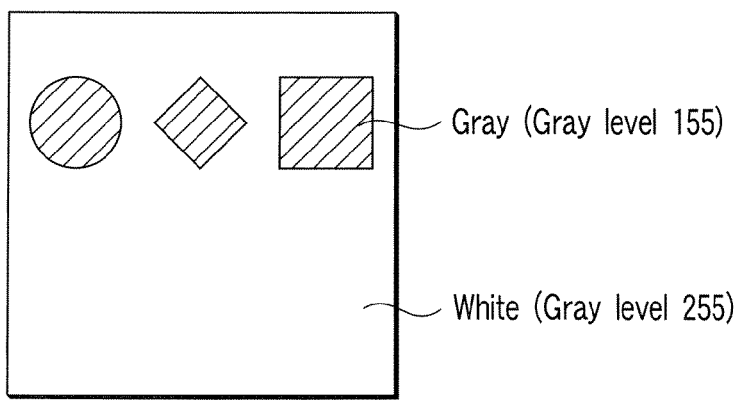
FIG. 7A is a view for explaining display content based on image data which is obtained after the original image data shown in FIG. 6 is converted.
Figure 7B:
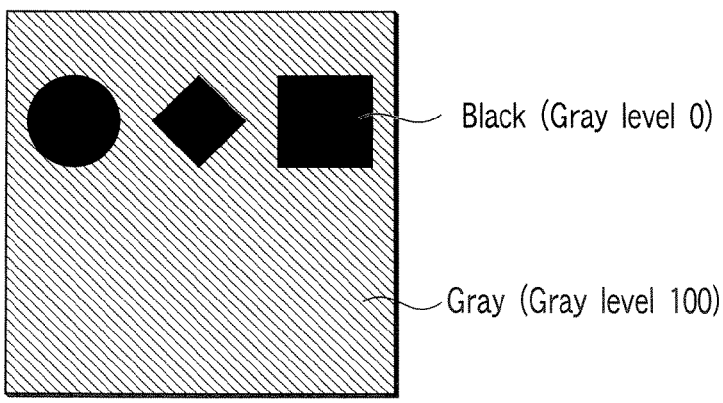
FIG. 7B is a view for explaining display content based on image data which is obtained after the original image data shown in FIG. 6 is converted.
Figure 7C:
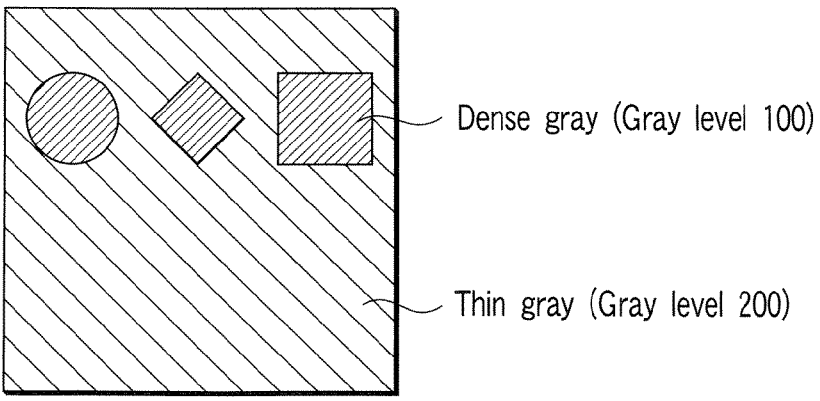
FIG. 7C is a view for explaining display content based on image data which is obtained after the original image data shown in FIG. 6 is converted.

In this case, as shown in FIG. 7A, the controller CNT does not change the gray level (gray level 255) of the background image, and converts the gray level of the main image from 0 to 155 (gray image). Alternatively, as shown in FIG. 7B, the controller CNT does not change the gray level (gray level 0) of the original image, and converts the gray level of the background image from 255 to 100 (gray image). Alternatively, as shown in FIG. 7C, the controller CNT converts the gray level of the background image from 255 to 200 (dense gray image) and converts the gray level of the main image from 0 to 100 (thin gray image).

By the conversion of image data, the difference of 255 between the gray levels of the background image and main image in the original image data is reduced to 100. Needless to say, the gradation range after conversion (i.e. the range between gray level 155 and gray level 255 in FIG. 7A, the range between gray level 0 and gray level 100 in FIG. 7B, and the range between gray level 100 and gray level 200 in FIG. 7C) is selected so that the difference in display luminance in oblique viewing-angle directions may become sufficiently small. Hence, the wide viewing angle mode, in which the difference between gray levels is 128 or more (preferably 100 or more), and the narrow viewing angle mode, in which the difference between gray levels is 128 or less (preferably 100 or less), can be realized.

In the example shown in FIG. 7A, in order to realize the narrow viewing angle mode, it is preferable to select such a gradation range after conversion that the display luminance range of the background image is 90 to 100 and the display luminance range of the character image is 50 to 90. In the example shown in FIG. 7B, in order to realize the narrow viewing angle mode, it is preferable to select such a gradation range after conversion that the display luminance range of the background image is 50 to 90 and the display luminance range of the character image is 90 to 100.

Other Embodiment 1

In the above-described embodiment, when the controller CNT converts first image data of display image, which is displayed in the gradation range of 0 to n−1, to second image data in the gradation range of i to j, the controller CNT assigns two gray levels of the first image data to one gray level of the second image data. The invention, however, is not limited to this example. As regards the number of gray levels of the first image data, which are to be assigned to the second image data, the first data may be converted such that the number of gray levels on the higher gradation side of the first image data is smaller than the number of gray levels on the lower gradation side of the first image data.

For example, as shown in FIG. 9, the controller CNT converts first image data, which is displayed in the gradation range of 256 gray levels from level 0 to level 255, to second image data of a 24 gray-level range between 232 and 255 (i.e. about 10% of the gradation range of the first image data before conversion). At this time, as regards the lower gradation side, the controller CNT assigns the first image data of 28 gray levels from level 0 to level 27 to gray level 232, and assigns the first image data of 19 gray levels from level 28 to level 46 to gray level 233. On the other hand, as regards the higher gradation side, the controller CNT assigns the first image data of 8 gray levels from level 244 to level 251 to gray level 254, and assigns the first image data of 4 gray levels from level 252 to level 255 to gray level 255.

This conversion can be realized by converting the gradation of the first image data to the gradation of the second image data on the basis of a function of an order of 1 or more. Specifically, the above-described nonlinear conversion is achieved by executing conversion on the basis of a relationship, $$Lout = a \cdot Lin^\beta + b$$

where Lin is a gradation (input gradation) of the first image data which is input to the controller CNT functioning as data conversion means, Lout is a gradation (output gradation) of second image data which is output from the controller CNT after conversion, and $\beta$ is a gradient coefficient (number of order) ($\beta > 1$) (a and b are coefficients that are properly set).

As described above, the gradation range, in which a difference in display luminance in oblique viewing-angle directions is small, is selected from the n-gray-level gradation range, and thus an image is displayed. Thereby, the narrow viewing angle mode, in which the visibility in oblique directions is decreased, can be realized.

Other Embodiment 2

The liquid crystal display panel LPN includes a plurality of kinds of color pixels in the case where the display device is applied not only to display of character images, but also to display of color images such as ordinary video. For example, the liquid crystal display panel LPN includes first color pixels which display an image in the gradation range of an n-number of gray levels in a first color, and second color pixels which display an image in the gradation range of the n-number of gray levels in a second color with a lower relative visibility than the first color. In this structure, when the narrow viewing angle mode is to be realized, the controller CNT does not need to convert, with respect to both the first and second color pixels, the first image data of a display image, which is displayed in the gradation range of gray levels 0 to n−1, uniformly to image data of the same gradation range. Specifically, in the narrow viewing angle mode, the controller CNT displays an image in a gradation range of i to j with respect to the first color pixel, and displays an image with respect to the second color pixel in a gradation range that is wider than the gradation range for the first color pixel. In other words, in the narrow viewing angle mode, in order to decrease the visibility in oblique viewing-angle directions, it is desirable to convert image data to a narrower gradation range, but the visibility of an image with a narrow gradation range is also decreased in the frontal direction. In order to secure the visibility in the frontal direction while decreasing the visibility in oblique directions, it is desirable to decrease the difference in luminance and to increase the gradation range. Thus, paying attention to the fact that the difference in luminance of a color with a low relative visibility is small even if the gradation range is increased, the controller CNT converts the first image data of the color with low relative visibility to second image data of a wider gradation range than a color with a high relative visibility.

For example, in the liquid crystal display panel LPN including red pixels, green pixels and blue pixels, the relative visibility of blue is lowest. Thus, as shown in FIG. 10, for example, when the controller CNT converts first image data, which is displayed in a 64 gray-level gradation range between level 0 and level 63, to second image data of a 24 gray-level gradation range between level 40 to level 63 with respect to the red pixel, the controller CNT converts first image data, which is displayed in the 64 gray-level gradation range, to second image data of a 29 gray-level gradation range between level 35 to level 63 with respect to the blue pixel. As regards the green pixel with the highest relative visibility, the controller CNT converts first image data, which is displayed in the 64 gray-level gradation range, to second image data of a narrowest gradation range, e.g. a 22 gray-level gradation range between level 42 to level 63.

With this structure, the narrow viewing angle mode is realized by lowering the visibility when the display image is observed in oblique directions, while the visibility (display quality) is improved when the display image is observed in the frontal direction.

Other Embodiment 3

The controller CNT may convert a part of first image data of a display image, which is displayed in a gradation range of 0 to n−1, to second image data of the display image, which is displayed in a gradation range of i to j.

Example 1

In the case where the first image data includes data corresponding to a description in which a plurality of characters are arranged, the controller CNT converts a part of characters of the description to image data of a gradation range of i to j. In this case, the other characters are displayed in an n-gray-level range of level 0 to level n−1. For example, "A" and "D" of a character string "ABCDE" are converted to the gradation range of i to j, by which the narrow viewing angle mode can be realized.

Figure 11A:
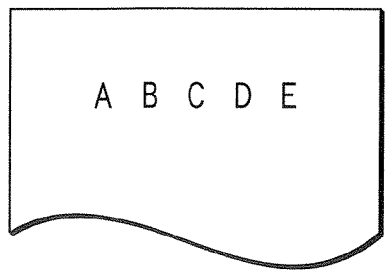
FIG. 11A is a view for explaining an example of conversion in Example 1 of Embodiment 3, and shows an example of an image which is visually recognizable when a liquid crystal display panel is observed in a frontal direction.
Figure 11B:
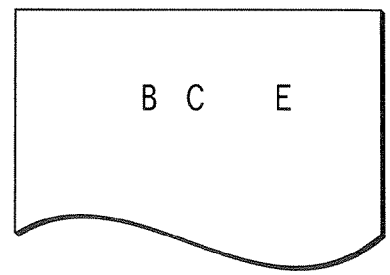
FIG. 11B is a view for explaining an example of conversion in Example 1 of Embodiment 3, and shows an example of an image which is visually recognizable when the liquid crystal display panel is observed in an oblique direction.

To be more specific, the controller CNT extracts at random some characters included in the input first image data, and outputs second image data in which the extracted characters are converted to display data in the gradation range of i to j and the other characters are converted to display data in the n-gray-level gradation range of 0 to n−1. Thereby, when the liquid crystal display panel LPN is observed in the frontal direction, "ABCDE" is visually recognized, as shown in FIG. 11A. However, when the liquid crystal display panel LPN is observed in oblique directions, the visibility of "A" and "D" decreases and the character string "ABCDE" can substantially be visually recognized only as "_BC_E", as shown in FIG. 11B. When the display panel is observed in an oblique direction, since the visibility of a part of characters is lowered, the other characters are visually recognized conspicuously. Thus, the meaning of the description of the display image can be made nonunderstandable.

Figure 12A:
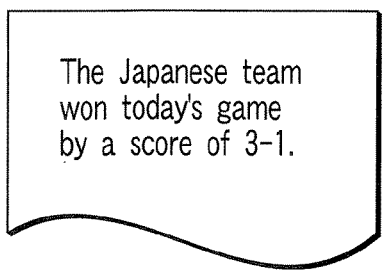
FIG. 12A is a view for explaining an example of conversion in Example 1 of Embodiment 3, and shows an example of an image which is visually recognizable when a liquid crystal display panel is observed in a frontal direction.
Figure 12B:
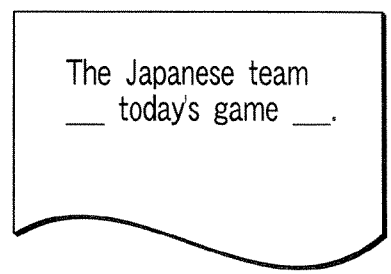
FIG. 12B is a view for explaining an example of conversion in Example 1 of Embodiment 3, and shows an example of an image which is visually recognizable when the liquid crystal display panel is observed in an oblique direction.

In this example, characters of the character string, which are to be partly converted, are extracted at random by software. Alternatively, characters, which are, in particular, to be made nonunderstandable, may be selected by a user, for example, a creator of the description, and a specified part of the description may be converted so as to realize the narrow viewing angle mode. Assume now that there is a character string (description) "The Japanese team won today's game by a score of 3-1." Of the character string, for example, the score "3-1" and the win/loss result "won" are converted, as characters to be made nonunderstandable, to a display image in the gradation range of i to j, by which the narrow viewing angle mode can be realized. Thus, when the liquid crystal display panel LPN is observed in the frontal direction, the description "The Japanese team won today's game by a score of 3-1." can be visually recognized, as shown in FIG. 12A. However, when the liquid crystal display panel LPN is observed in the oblique direction, the visibility of the specific parts "3-1" and "won" is lowered and the description is merely recognized as "The Japanese team _____ today's game _____.", as shown in FIG. 12B. In this way, when the display panel is observed in the oblique direction, since the visibility of a part of characters is lowered, the other characters are visually recognized conspicuously. Thus, the meaning of the description of the display image can be made nonunderstandable.

Example 2

Figure 13:
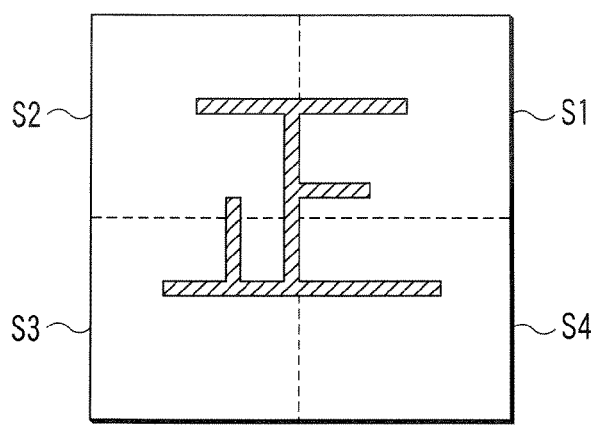
FIG. 13 is a view for explaining an example of conversion in Example 2 of Embodiment 3.

In a case where first image data includes data corresponding to a character, the controller CNT converts a partial segment of the character to a display image in the gradation range of i to j. Assume now that the character is composed of four segments S1, S2, S3 and S4, as shown in FIG. 13. In this case, partial segments of the character, for example, two segments S2 and S4, which are symmetric about a point, are converted to the gradation range of i to j, by which the narrow viewing angle mode can be realized.

To be more specific, with respect to each of characters included in the input first image data, the controller CNT outputs second image data in which the two segments S2 and S4 are converted to the gradation range of i to j and the other segments S1 and S3 are converted to the n-gray-level gradation range of 0 to n−1. Thereby, when the liquid crystal display panel LPN is observed in the frontal direction, the character is correctly recognized, as shown in FIG. 14A. However, when the liquid crystal display panel LPN is observed in oblique directions, the visibility of the character is decreased, as shown in FIG. 14B. When the display panel is observed in an oblique direction, since the visibility of partial segments of the character is lowered, the other segments are visually recognized conspicuously. Thus, not only the visibility of the character is lowered, but also the meaning of the description, which is composed of the character string including the low-visibility character, can be made nonunderstandable.

Example 3

The controller CNT converts a part of first image data corresponding to a geometrical part of a display image, which is displayed based on the first image data, to a gradation range of i to j. For example, the controller CNT converts geometrical parts of the first image data, that is, hatched parts in FIG. 15, which are included in the display image that is displayed based on the first image data, to the gradation range of i to j, by which the narrow viewing angle mode can be realized.

Figure 16A:
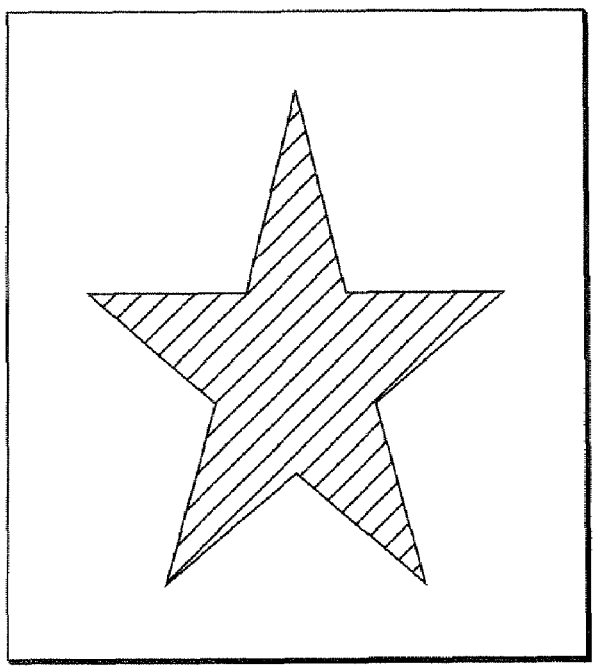
FIG. 16A is a view for explaining an example of conversion in Example 3 of Embodiment 3, and shows an example of an image which is visually recognizable when a liquid crystal display panel is observed in a frontal direction.
Figure 16B:
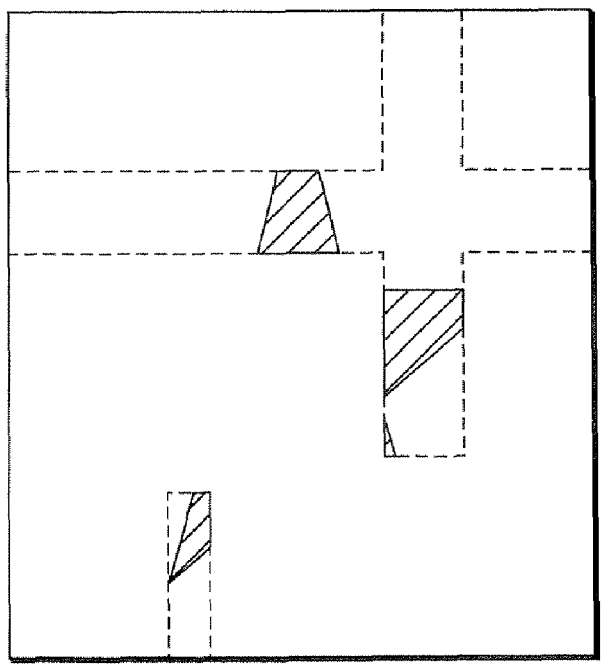
FIG. 16B is a view for explaining an example of conversion in Example 3 of Embodiment 3, and shows an example of an image which is visually recognizable when the liquid crystal display panel is observed in an oblique direction.

To be more specific, the controller CNT outputs second image data in which image data, which corresponds to geometrical parts of the input image data, is converted to the gradation range of i to j, and image data corresponding to the other parts is converted to an n-gray-level gradation range of 0 to n−1. Thereby, as shown in FIG. 16A, when the liquid crystal display panel LPN is observed in the frontal direction, the entirety of the display image based on the first image data can visually recognized. However, when the liquid crystal display panel LPN is observed in the oblique direction, the visibility of the geometrical parts of the display image is lowered, as shown in FIG. 16B. Thus, when the liquid crystal display panel LPN is observed in the oblique direction, the visibility of the parts of the display image is lowered and the other parts of the display image are visually recognized conspicuously. Therefore, the content of the display image can be made nonunderstandable.

<Example of Structure of Controller>

A description is given of an example of the structure of the controller CNT, which is applicable to the foregoing embodiments in the case where not only an image of a character but also a color image, such as ordinary video, is to be displayed.

Image data (first image data) before conversion is, for example, of a YMCK (complementary colors+black) type, a YUV (luminance+chrominance) type, or an RGB (three primary colors of red, green and blue) type. The conversion of gradation can most suitably be executed for image data of the RGB (three primary colors) type. This agrees with the fact that the currently used liquid crystal display device adopts the color display format based on the three primary colors of RGB.

Figure 17:
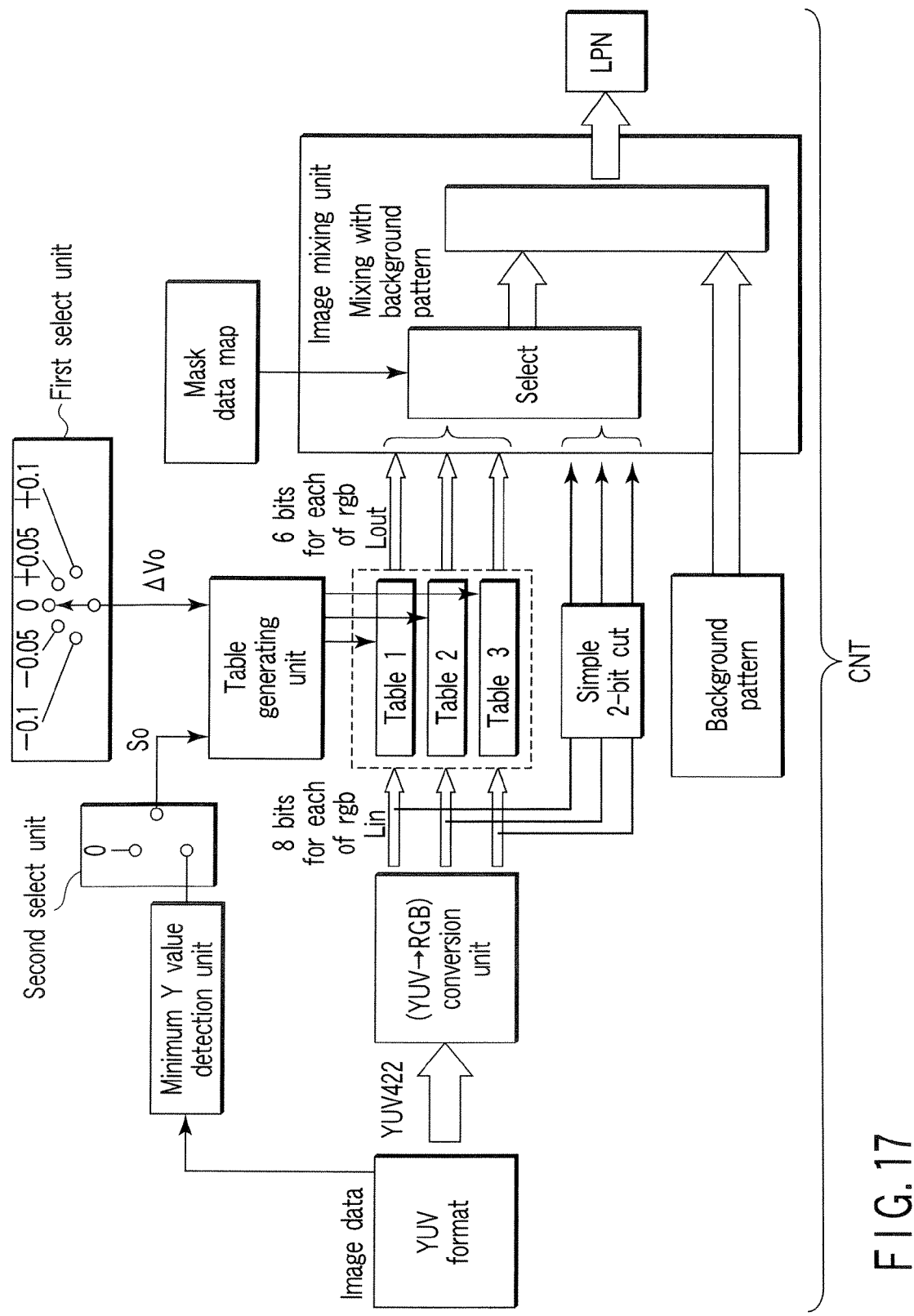
FIG. 17 is a view for describing an example of the structure of a controller which is applicable to the embodiments of the invention.

Specifically, in the controller CNT, as shown in FIG. 17, a conversion unit converts image data of a YUV-format, which is a general image data format, to an RGB-format data. Thereby, image data corresponding to the three primary colors of red (R), green (G) and blue (B) are converted to image data having data formats of 8-bit gradation ranges, respectively. Then, the controller CNT converts the gradations of the image data of R, G and B. These image data correspond to the first image data before gradation conversion in the above-described embodiments.

For example, the gradation of the R image data is converted on the basis of table 1. Similarly, the gradation of G image data is converted on the basis of table 2, and the gradation of B image data is converted on the basis of table 3. The image data, which have been converted based on tables 1 to 3, correspond to the second image data in the above-described embodiments.

FIG. 18A shows an example of table 1 for converting the gradation of the R image data. FIG. 18B shows an example of table 2 for converting the gradation of the G image data. FIG. 18C shows an example of table 3 for converting the gradation of the B image data. In tables 1 to 3, Lin indicates the gradation of image data before conversion, and Lout indicates the gradation of image data after conversion. In this example, the controller CNT converts an 8-bit gradation range to a predetermined range in a 6-bit gradation range.

For example, as regards the R image data, the controller CNT converts first image data, which is displayed in a 256-gray-level gradation range from level 0 to level 255, to 6-bit-format second image data of a 24-gray-level gradation range from level 40 to level 63. As regards the G image data, the controller CNT converts first image data, which is displayed in a 256-gray-level gradation range from level 0 to level 255, to 6-bit-format second image data of a 22-gray-level gradation range from level 42 to level 63. As regards the B image data, the controller CNT converts first image data, which is displayed in a 256-gray-level gradation range from level 0 to level 255, to 6-bit-format second image data of a 29-gray-level gradation range from level 35 to level 63. In this case, as described in connection with Embodiment 1, the controller CNT nonlinearly converts the gradation of the first image data to the gradation of the second image data.

The above-described tables are generated by a table generating unit in the controller CNT. The table generating unit generates the tables on the basis of a value $\Delta V0$ and a value S0, which can be set by the user, and a relational formula 1 as shown in FIG. 19. In this example, values $\beta$, $\Delta V0$ and S0 are set at values shown in FIG. 20 with respect each image data of R, G and B. In the relational formula 1, normalized gradation values are used. However, in an actual process, in the case of an n-gray-level gradation of, e.g. 256 gray levels, the relational formula 1 is applied by assuming $Sin=Lin/(n-1)$, and output values are obtained by assuming $Sout=Lout/(n-1)$.

The value $\beta$ is a parameter for determining a distribution of gray levels after conversion. By value $\beta$, the smallness in gradation reproduction width is corrected, and the appearance of the image is adjusted. As the value $\beta$ is increased, a greater side of Sout is emphasized (i.e. gray levels are distributed with greater intervals on the higher gradation side than on the lower gradation side). According to experiments by the inventor, the optimal value of $\beta$ is 1.5. As shown in FIG. 20, $\beta$ is set at 1.5 with respect to each of R, G and B.

The value V0 is a parameter for determining the degree of the viewing angle control effect. It is preferable to properly set V0 in accordance with the characteristics (liquid crystal mode, design, gradation setting, etc.) of the liquid crystal display panel LPN. The value V0 may take a value in the range between 0 and 1. As the value of V0 increases, the viewing angle control effect becomes greater but the appearance of the image in the frontal direction becomes poorer (i.e. the image appears to be thinner). In this example, V0 is a sum of a properly set value and $\Delta V0$. $\Delta V0$ can be set by the user. Normally, $\Delta V0=0$, but the value of $\Delta V0$ can be selected from five values (−0.1, −0.05, 0, +0.05, and +0.1) through a first select unit. Thereby, the appearance of the image in the frontal direction and the viewing angle controllability in the oblique direction can be adjusted.

In this example, as shown in FIG. 20, V0 is set at different values for R, G and B, in addition to $\Delta V0$. The value V0 defines a lower limit of the gradation that is used after conversion. According to experiments by the inventor, V0 for blue (B) can be set to a lowest value. By applying a proper value of V0, the appearance of the image in the frontal direction and the viewing angle controllability in the oblique direction were successfully improved.

The value S0 is a minimum gradation value of an image. In general, gradation values are used in a range to the darkest gray level. Thus, in almost all cases, satisfactory results are obtained by using 0 (zero) as S0. In the structure shown in FIG. 17, the value of S0 can be set by a second select unit which selects one of zero and an output from a minimum Y-value detection unit which detects a minimum value of a Y value (luminance) of the image data before conversion (first image data). A method of using 0 and a method of using a value corresponding to the image can be switched. In the case of displaying motion video, if the parameter is dynamically varied, the video becomes unnatural. It is thus desirable to fix S0 at 0.

Figure 21:
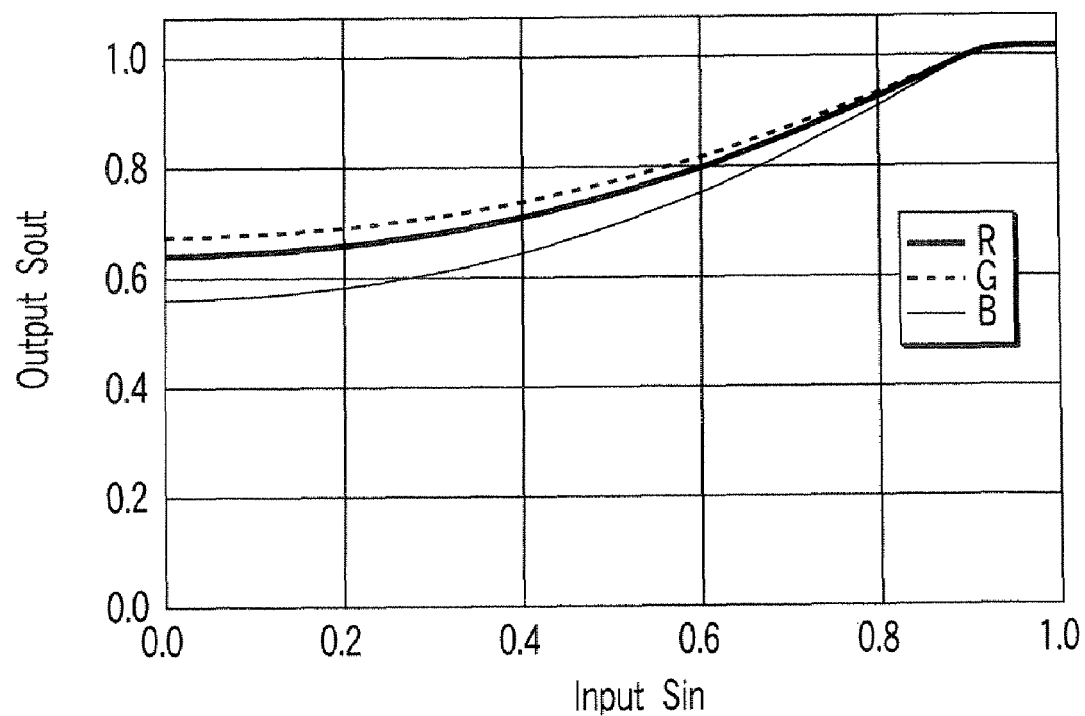
FIG. 21 shows an example of conversion characteristics which are based on the relational formula shown in FIG. 19.

Based on these values and the relational formula, conversion characteristics for R, G and B, for example, as shown in FIG. 21, can be obtained. The table generating unit generates tables corresponding to these conversion characteristics, that is, tables as shown in FIGS. 18A to 18C. Outputs from tables 1, 2 and 3 are 6-bit (64 gray levels) image data.

In the controller CNT, the output values, which are converted on the basis of the tables, and output values, which are obtained by simple 2-bit cutting from the 8-bit gradation values that are converted to the RGB format in the conversion unit, are input to an image mixing unit.

Based on a mask data map which is a map of 1-bit data corresponding to the number of pixels of an image as shown in FIG. 15, the image mixing unit selects the converted data or the simple 2-bit cut data as the gradation values of the input data, depending on whether the mask data is 1 or 0. Then, the image mixing unit mixes the selected data and a background pattern, and outputs the mixed data to the liquid crystal display panel LPN.

According to the controller CNT with the above-described structure, the nonlinear conversion as described in connection with, e.g. Embodiment 1, can be realized by setting the value $\beta$ in the table generating unit at a value greater than 1. As has been described in connection with Embodiment 2, the gradation ranges of the image data after conversion, which correspond to R, G and B, can be made different by properly setting the value V0. As has been described in connection with Embodiment 3, only a part of the image data can be converted to the narrow viewing angle mode by properly selecting the use of the converted data or the use of the simple 2-bit cut data, on the basis of the mask data map.

<Optimal Gradation Range in Narrow Viewing Angle Mode>

The gradation range which is selected for realizing the narrow viewing angle mode, that is, the gradation range of i to j, should preferably be a range of n/2 or less of the number n of displayable gray levels. In order to set such a gradation range, verification was conducted by using a liquid crystal display panel which actually displays an image.

Figure 22:
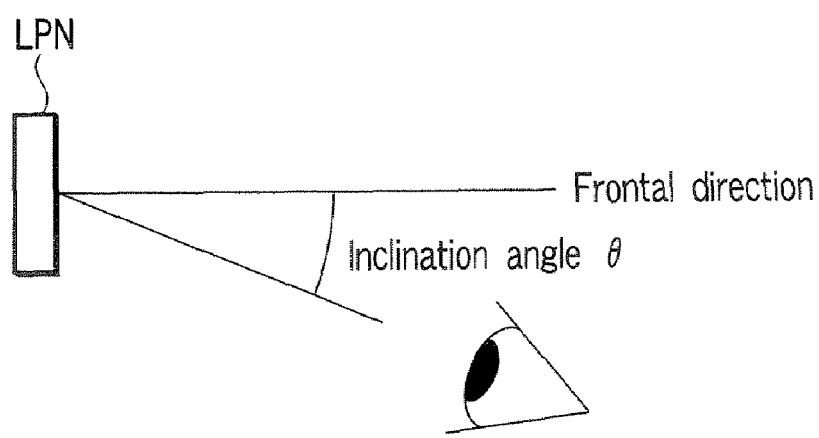
FIG. 22 is a view for explaining a verification method which is applied when an optimal gradation range in a narrow viewing angle mode is to be determined.

To begin with, verification was conducted with respect to the viewing angle at which the liquid crystal display panel was observed in an oblique direction. Specifically, as shown in FIG. 22, two persons sit side by side, one of the persons holds a mobile terminal device that is equipped with the liquid crystal display panel LPN, and the other person peeps at the liquid crystal display panel LPN in a natural posture. At this time, the person, who holds the mobile terminal device, holds it so as to observe the liquid crystal display panel LPN in the front direction (i.e. normal direction). An angle $\theta$ (i.e. an angle relative to a normal direction), at which the other person peeps at the liquid crystal display panel LPN, was measured.

Figure 23:
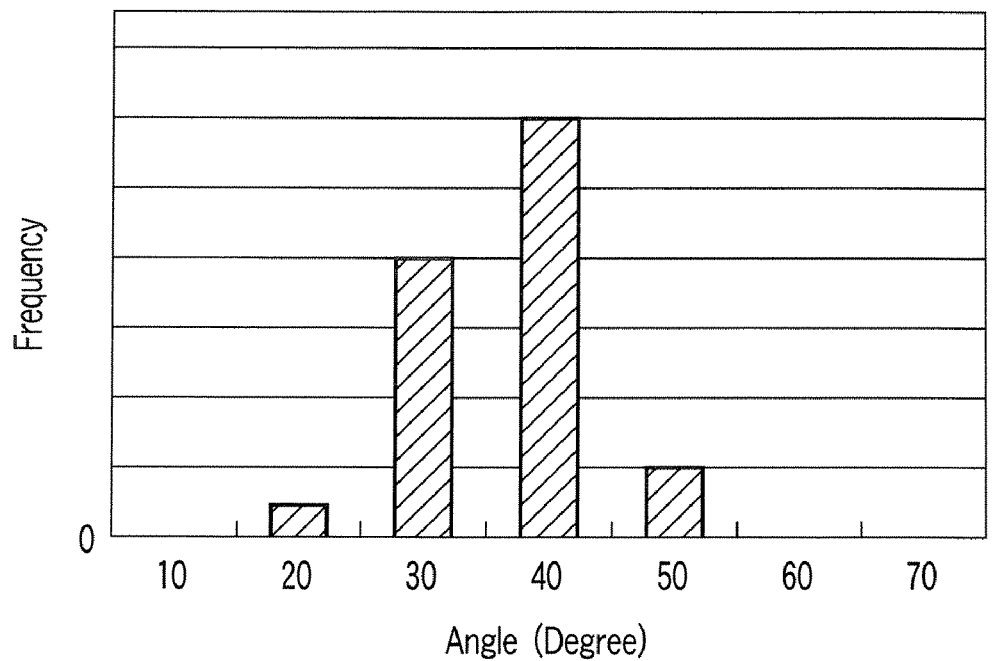
FIG. 23 shows a distribution of angles at which a display screen is peeped at by a stranger when the user and the stranger are side by side.

FIG. 23 shows a measurement result. As is clear from the measurement result, the oblique angle, at which the display screen is most frequently peeped at by a neighboring person when the two persons sit side by side, is 40° relative to the normal direction to the display screen.

Next, verification was conducted with respect to the gray levels at which the display image cannot be visually recognized when the liquid crystal display panel LPN of the above-described mode is observed in the oblique direction of 40° to the normal direction. Assume that the liquid crystal display panel LPN displays an image in a 6-bit gradation range, that is, a 64-gray-level gradation range. The gradation range of a background part of the display image is set at gray level 63 which corresponds to the maximum gradation (white). The liquid crystal display panel LPN displays an image in which the colors of characters mixed on the background part are set at evaluation gray levels L. The liquid crystal display panel LPN is observed in an oblique direction of θ=40°. The levels L of the respective colors were gradually lowered (i.e. darkened) from level 63, and the gray levels, at which the characters were first recognized, were measured.

Figure 24:
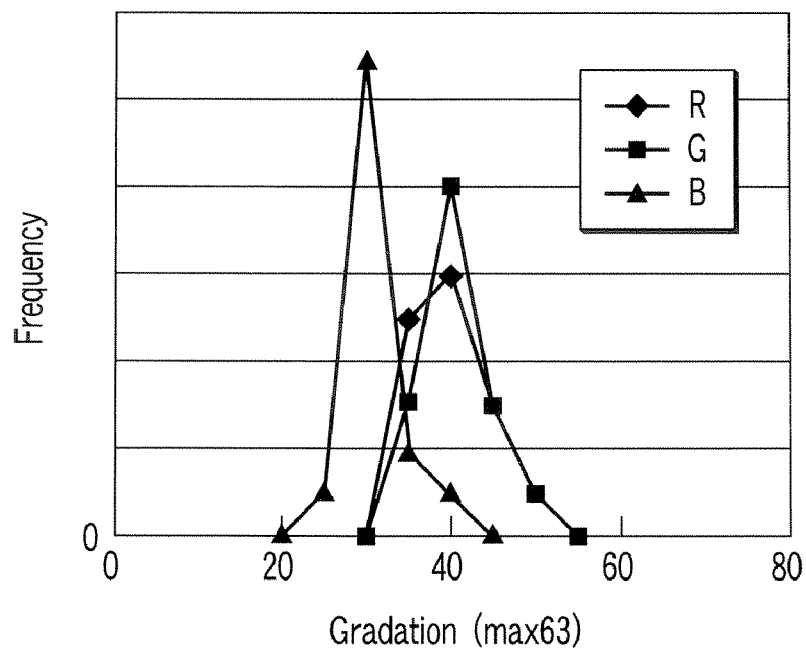
FIG. 24 shows a distribution of gray levels at which an image cannot be recognized when the image is observed at 40° in an oblique direction.

As shown in FIG. 24, it was confirmed that the character of red (R) could not be recognized in a gradation range to L=40, the character of green (G) could not be recognized in a gradation range to L=42, and the character of blue (B) could not be recognized in a gradation range to L=35. In other words, it was understood that with respect to each of the colors, the image displayed in the gradation range of i to j was hardly recognized when the gradation range of i to j was set at n/2 or less of the number n of displayable gray levels. In particular, when the gradation range of i to j for realizing the narrow viewing angle mode is to be set, if the maximum gray level i is set to be equal to the light-side maximum gray level of the n-number of gray levels, a wider gradation range can be set and the display quality at the time of observation in the frontal direction can be improved.

As described above, the present embodiment can realize the viewing angle control which can effect selective switching between the narrow viewing angle mode and the side viewing angle mode by making use of the viewing angle characteristics of the liquid crystal display device that is to be mounted. A liquid crystal panel for varying the viewing angle is not needed in addition to the liquid crystal display device for displaying an image. Therefore, the increase in cost of the display device and the increase in thickness, weight and power consumption of the entirety of the display device can be suppressed. The narrow viewing angle mode can be realized in all directions by using the liquid crystal display device with isotropic viewing angle characteristics and by displaying an image by selectively setting the display luminance range or gradation range, in which the difference in display luminance becomes sufficiently small in the oblique viewing-angle direction, at an angle greater than a predetermined angle relative to the normal direction to the display surface.

In particular, if the above-described liquid crystal display device is applied as a display device of a mobile terminal device such as a mobile phone, the display image is prevented from being peeped at by a nearby stranger.

The present invention is not limited directly to the above-described embodiments. In practice, the structural elements can be modified without departing from the spirit of the invention.

For example, the controller CNT may be image processing means which is composed of a CPU and software. An input image of a gradation range of 0 to n−1 is converted to a gradation range of i to j, or converted and supplied to the signal line driver. Thereby, the narrow viewing angle mode or the wide viewing angle mode is realized. The conversion of gradation may be applied to processing of all input data or a specific part of the input data.

The controller CNT, without departing from the spirit of the invention, may be an image generating device which includes a means for generating images of characters to be displayed, on the basis of input character codes, and has a function of generating characters with character image gradations corresponding to the narrow viewing angle mode and the wide viewing angle mode, which are set by the mode switching unit MS. In this case, when the mode switching unit MS selects the narrow viewing angle mode, all character images may not be generated in the narrow viewing angle mode, and only a specific part of the character images may be converted to the narrow viewing angle mode.

In the embodiments, the number n of gray levels is set. Alternatively, the invention is applicable to the case of using analog signals having a continuously varying gradation. In this case, the gradation can be expressed by substituting real numbers for i and j.

When the above-described embodiments are applied to a transflective liquid crystal display device, it is preferable to adopt such a structure that switching elements W are disposed at the respective reflective parts and transmissive parts and the voltages to be applied to the pixels are made individually controllable. Such a transflective liquid crystal display device may be configured to display an image in a gradation range of i to j so that only the transmissive parts may realize the narrow viewing angle mode. In this case, it is desirable to effect such switching that the reflective parts display an image that is different from the image on the transmissive parts. Specifically, when the transmissive parts display an image in the gradation range of i to j, the reflective parts display an image different from the image on the transmissive parts, for example, a black raster image. This does not prevent the effect that a sufficiently visibility of a display image is obtained in the frontal direction of the transmissive display parts while the visibility of the image is greatly reduced in the oblique direction. Even if the image is peeped at, the content of the image is difficult to recognize.

As described above, various inventions can be made by properly combining the structural elements disclosed in the embodiments. Some structural elements may be omitted from all the structural elements disclosed in the embodiments. Furthermore, structural elements in different embodiments may properly be combined.

What is claimed is:

1. A liquid crystal display device having a gradation display function comprising:

first color pixels which display an image in the gradation range of an n-number of gray levels in a first color; and second color pixels which display an image in the gradation range of the n-number of gray levels in a second color with a lower relative visibility than the first color;

wherein the first color pixels have a viewing angle characteristic of $Mi/Mj \leq 1.3$ in a case where a display luminance range in a normal direction to a display surface in a gradation range of a gray level i to a gray level j is Li to Lj and a display luminance range in an oblique viewing-angle direction of 30° or more is Mi to Mj (where n, i and j are real numbers, and $n \geq i > j \geq 0$), and wherein the liquid crystal display device has a display mode in which a display image is displayed in the gradation range of i to j with respect to the first color pixels, and a display image is displayed with respect to the second color pixels in a gradation range that is wider than the gradation range for the first color pixels.

2. The liquid crystal display device according to claim 1, wherein when the display luminance range in the normal direction to the display surface is Li to Lj, Li/Lj≧1.5.

3. The liquid crystal display device according to claim 1, wherein the display mode comprises a narrow viewing angle mode in which a display image is displayed in the gradation range of i to j with respect to the first color pixels, and a wide viewing angle mode in which a display image is displayed in a gradation range of 0 to n−1 with respect to the first color pixels, and
the liquid crystal display device includes switching means for effecting switching between the narrow viewing angle mode and the wide viewing angle mode.

4. The liquid crystal display device according to claim 3, further comprising data conversion means for converting, upon switching to the narrow viewing angle mode by the switching means, image data of the display image with respect to the first color pixels, which is displayed in the gradation range of 0 to n−1, to image data of the gradation range of i to j.

5. The liquid crystal display device according to claim 4, wherein upon switching to the narrow viewing angle mode by the switching means, the data conversion means converts the gradation of at least one of a background image, which is displayed with a single gray level, and a main image, which is displayed with a single gray level, such that a difference in gradation between the background image and the main image becomes smaller than in the wide viewing angle mode.

6. The liquid crystal display device according to claim 1, wherein the liquid crystal display device comprises:
an array substrate including active switching elements and pixel electrodes in association with pixels;
a counter-substrate including a counter-electrode which is disposed to be opposed to the pixel electrodes;
a liquid crystal layer with a negative dielectric-constant anisotropy, which is held between the array substrate and the counter-substrate; and
a structure for dividing a direction of alignment into at least two directions in each of the pixels,
wherein liquid crystal molecules in each pixel are aligned substantially vertical to the substrate surface in a state in which no voltage is applied to the pixel or a voltage less than a threshold is applied to the pixel, the liquid crystal molecules in each pixel are aligned oblique or substantially parallel to the substrate surface in a state in which a voltage not less than the threshold is applied to the pixel, and the direction of inclination is substantially determined by a direction of lines of electric force.

7. A mobile terminal device comprising the liquid crystal display device according to claim 1.

8. The liquid crystal display device according to claim 1, further comprising data conversion means for converting first image data of the display image with respect to the first color pixels, which is displayed in the gradation range of 0 to n−1, to second image data of the display image, which is displayed in the gradation range of i to j,
wherein as regards a number of gray levels of the first image data, which are to be assigned to the second image data, the first data is converted such that the number of gray levels on a higher gradation side of the first image data is smaller than the number of gray levels on a lower gradation side of the first image data.

9. The liquid crystal display device according to claim 8, wherein the data conversion means converts the gradation of the first image data to the gradation of the second image data on the basis of a function of an order of 1 or more.

10. The liquid crystal display device according to claim 1, further comprising data conversion means for converting a part of first image data of the display image with respect to the first color pixels, which is displayed in the gradation range of 0 to n−1, to second image data of the display image, which is displayed in the gradation range of i to j.

11. The liquid crystal display device according to claim 10, wherein the first image data includes data corresponding to a description in which a plurality of characters are arranged, and
the data conversion means converts a part of characters of the description to the gradation range of i to j.

12. The liquid crystal display device according to claim 10, wherein the first image data includes data corresponding to a character, and
the data conversion means converts a segment of the character to gradation range of i to j.

13. The liquid crystal display device according to claim 10, wherein the data conversion means converts a geometrical part of the first image data of the display image with respect to the first pixels, which is displayed on the basis of the first image data, to the gradation range of i to j.

14. The liquid crystal display device according to claim 1, wherein the gradation range of i to j is a gradation range in which the number of gray levels is n/2 or less.

15. The liquid crystal display device according to claim 14, wherein the gray level i is equal to a light-side maximum gray level of the n-number of gray levels.

* * * * *